US006951375B2

(12) United States Patent
Patton et al.

(10) Patent No.: US 6,951,375 B2
(45) Date of Patent: *Oct. 4, 2005

(54) LARGE AREA MARKING DEVICE AND METHOD FOR PRINTING

(75) Inventors: David L. Patton, Webster, NY (US); Loretta E. Allen, Hilton, NY (US); Dale F. McIntyre, Honeoye Falls, NY (US); Steven S. Chapman, Corfu, NY (US); Jacob L. Pietruszewski, Penfield, NY (US)

(73) Assignee: Eastman Kodak Company, Rochester, NY (US)

( * ) Notice: Subject to any disclaimer, the term of this patent is extended or adjusted under 35 U.S.C. 154(b) by 49 days.

This patent is subject to a terminal disclaimer.

(21) Appl. No.: 10/441,713

(22) Filed: May 20, 2003

(65) Prior Publication Data

US 2004/0233242 A1 Nov. 25, 2004

(51) Int. Cl.⁷ .................................................. B41J 29/38
(52) U.S. Cl. ............................ 347/3; 347/37; 358/1.9
(58) Field of Search .............................. 347/3, 14, 37, 347/109; 358/1.9, 472; 382/254, 294; 400/74, 88, 695, 697, 700, 400; 404/93, 94; 434/84

(56) References Cited

U.S. PATENT DOCUMENTS

| | | | |
|---|---|---|---|
| 3,858,359 A | | 1/1975 | Leliaert ........................ 451/88 |
| 4,748,453 A | | 5/1988 | Lin et al. ...................... 347/41 |
| 4,763,281 A | * | 8/1988 | Arakawa .................... 358/1.11 |
| 5,186,983 A | | 2/1993 | Brown ........................ 427/261 |
| 5,373,350 A | * | 12/1994 | Taylor et al. .................. 399/2 |
| 5,434,956 A | * | 7/1995 | Son et al. ..................... 358/1.5 |
| 5,446,559 A | | 8/1995 | Birk ........................... 358/473 |
| 5,790,915 A | * | 8/1998 | Arcaro et al. .................. 399/2 |
| 5,806,996 A | | 9/1998 | Leys et al. ............. 400/120.16 |
| 5,893,678 A | | 4/1999 | Laybros et al. ............... 404/94 |
| 5,925,889 A | | 7/1999 | Guillory et al. ....... 250/559.16 |
| 5,927,872 A | | 7/1999 | Yamada ........................ 400/88 |
| 5,931,166 A | | 8/1999 | Weber et al. ................. 132/73 |
| 6,058,843 A | | 5/2000 | Young ......................... 101/483 |
| 6,059,392 A | | 5/2000 | Park .............................. 347/8 |
| 6,062,686 A | | 5/2000 | Kinoshita et al. ........... 347/109 |
| 6,074,693 A | | 6/2000 | Manning .................... 427/137 |
| 6,116,707 A | | 9/2000 | Avida ..................... 346/139 R |
| 6,173,904 B1 | | 1/2001 | Doherty et al. ................ 239/1 |
| 6,227,643 B1 | | 5/2001 | Purcell et al. ................ 347/19 |
| 6,241,410 B1 | | 6/2001 | Hager ......................... 401/89 |
| 6,295,737 B2 | | 10/2001 | Patton et al. ................ 33/18.1 |
| 6,298,154 B1 | * | 10/2001 | Cok ........................... 382/186 |
| 6,299,934 B1 | | 10/2001 | Manning .................... 427/137 |
| 6,536,345 B1 | | 3/2003 | Young ......................... 101/485 |
| 6,561,607 B1 | | 5/2003 | Lubinsky et al. .............. 347/8 |
| 6,719,467 B2 | * | 4/2004 | Hess et al. .................... 400/76 |
| 6,729,706 B1 | * | 5/2004 | Patton et al. ................... 347/2 |

OTHER PUBLICATIONS

U.S. Appl. No. 10/346,148, filed Jan. 16, 2003, David L. Patton et al. entitled, "Printing and Apparatus For Printing An Image on a Selected Surface".
U.S. Appl. No. 10/366,933, filed Feb. 14, 2003, David L. Patton et al. entitled, "Large Area Marking Device and Method for Printing".

* cited by examiner

*Primary Examiner*—Lamson Nguyen
*Assistant Examiner*—Blaise Mouttet
(74) *Attorney, Agent, or Firm*—Norman Rushefsky; Mark G. Bocchetti

(57) ABSTRACT

A method and apparatus for printing an image on a large surface area or walkway provides for imagewise marking of the surface with a color marking solution, to form a visible image on the surface during an image recording mode of a marking engine. The marking engine includes a scanner and the marking engine moves along the surface and operates the scanner to sense a crude image upon the surface and generates data signals representing the crude image or boundaries defined by the crude image scanned. In response to data signals the marking engine is operated to print an enhanced image of the crude image and/or to color the crude image so that the printing overlies the crude image.

36 Claims, 19 Drawing Sheets

LARGE AREA MARKING DEVICE AND METHOD FOR PRINTING

CROSS REFERENCE TO RELATED APPLICATIONS

This application is related to U.S. application Ser. No. 10/346,148, filed Jan. 16, 2003, in the names of David L. Patton et al and entitled, "Printing and Apparatus For Printing An Image on a Selected Surface" and to U.S. application Ser. No. 10/366,933, filed Feb. 14, 2003, in the names of David L. Patton et al and entitled, "Large Area Marking Device and Method for Printing".

FIELD OF THE INVENTION

This invention is directed to printing apparatus and method for forming an image over a large surface area or walkway such as driveways, fields and/or decks or patios.

BACKGROUND OF THE INVENTION

This invention generally relates to a marking apparatus and methods and more particularly relates to an apparatus and method for marking a large surface with multiple colors.

It is often desirable to form color images on a large area. For example, children love to draw and write with colored chalk on a driveway. Similarly to drawing with a crayon on a blank piece of paper the child creates drawings, but does not usually have the ability to draw detailed animals, cartoon characters, scenes, and the like. Children like to color in coloring books and print images using a desktop inkjet printer because they can create detailed drawings that are in full color. These activities are fun, and the child does not need the skills of an artist to produce colorful graphic images. When the child attempts to draw the image manually on a surface such as a driveway, the result may be less than satisfactory. Therefore, it is desirable to provide a marking device capable of forming more pleasing images on a large surface such as a driveway.

U.S. Pat. Nos. 5,446,559 and 6,062,686 disclose devices that are designed to print on a small smooth surface such as a sheet of paper on a table or desktop. Because of their compact construction, these so-called handheld devices are not burdened by the size and weight of conventional devices that perform similar functions, such as desktop and large format printers. Furthermore, these handheld devices offer superior flexibility in printing and can be used with over sized media. For example, such handheld devices can print on media that is much larger than used in a desktop printer.

Despite such positive attributes of these handheld devices such as being compact, other less desirable attributes still remain. For example, these handheld devices still require the attention and labor of the user to manually sweep them over an appropriate medium to produce printing on the medium. They are limited in size to a medium that is the size of a sheet of paper or a poster. They are not equipped to print on a rough surface such as asphalt or concrete. To overcome the problems of conveying a hand held device over the surface to be printed a drive mechanism was added. Unlike a desktop printer, the drive mechanism contacts the surface being printed. This creates the problem of contacting the area that has just been printed and damaging the image. In small format printers and printers that are printing several lines of text this is not a problem, but it is a problem for a device printing a large area with a continuous image.

Charles Manning in U.S. Pat. Nos. 6,299,934 and 6,074,693 discloses a global positioning system for controlling a paint spraying system used to apply paint to a large surface such as a road. The systems described in these patents may be suited for locating a paint sprayer used for painting lines on a road to within a few feet, but GPS systems do not possess the positioning precision required for printing an image. Moreover, the paint-spraying device described by Manning does not have the ability to deliver a marking medium to the marking surface with the amount and with the accuracy necessary to form a desirable image.

Therefore, there has been a long-felt need to provide an apparatus and method for suitably marking a large area in a manner which automatically accurately determines the size of the large area to be printed, the distance to the surface and quickly, yet precisely, applies a marking medium uniformly to predetermined portions of the surface and can provide multiple color marking to the surface wherein the surface comprises large surface areas of pavement, wood or other structural composites, or concrete, asphalt, brick, grass or laid carpeting collectively hereinafter referred to as a "walkway," even though cars or other vehicles may also be driven over same.

SUMMARY OF THE INVENTION

A method and apparatus for conveying a portable printing mechanism over a large surface area such as a walkway having a printing means for forming indicia on the surface area is described.

In accordance with a first aspect of the invention, there is provided an apparatus for printing an image on a surface, the apparatus comprising: a movable marking engine including a scanner, the marking engine moving along the surface and the scanner being operative to sense a crude image upon the surface and to generate data signals representing the crude image or boundaries defined by the crude image scanned; and a controller for controlling the marking engine, the controller being responsive to the data signals to control the marking engine to print an enhanced image of the crude image and/or to color the crude image so that the printing overlies the crude image.

In accordance with a second aspect of the invention, there is provided a method for printing an image on a surface, the method comprising the steps of providing a movable marking engine that includes a scanner; moving the marking engine along the surface and operating the scanner to sense a crude image upon the surface and generating data signals representing the crude image or boundaries defined by the crude image scanned; and in response to the data signals operating the marking engine to print an enhanced image of the crude image and/or to color the crude image so that the printing overlies the crude image.

In the preferred embodiment, the invention comprises a printing assembly including a housing, a drive and steering mechanism, a power supply, a printer, logic and control unit, and a communications device. The portable printing mechanism can be electronically guided by a removable Erasable Programmable Read Only Memory (EPROM) located in the logic and control unit or it can be guided by transmissions from a remote control device. Alternately, the portable printing mechanism can optically follow a line manually drawn on the driveway or other large surface area.

The portable printing mechanism maps the area to be printed, determines where within the area the indicia is to be formed and the initial starting position, maintains the correct distance between the print head and the surface area to be printed, and maintains the correct spacing of the lines being printed while the indicia is formed.

BRIEF DESCRIPTION OF THE DRAWINGS

While the specification concludes with claims particularly pointing out and distinctly claiming the subject matter of the present invention, it is believed the invention will be better understood from the following description when taken in conjunction with the accompanying drawings wherein:

DETAILED DESCRIPTION OF THE PREFERRED EMBODIMENTS

The invention will be described in detail with particular reference to certain preferred embodiments thereof, but it will be understood that variations and modifications can be effected within the spirit and scope of the invention.

Figure 1:
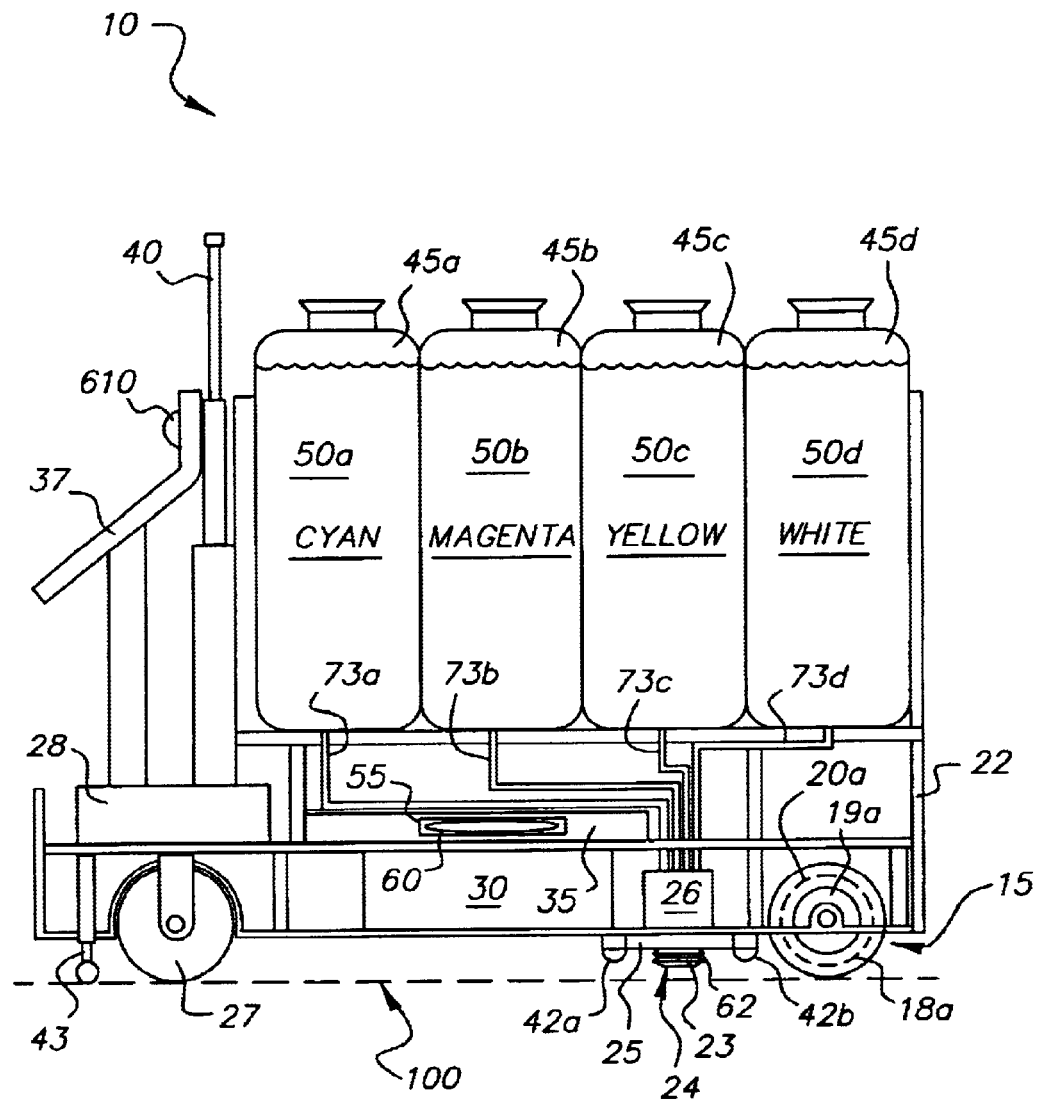
FIG. 1 is a view in elevation of one embodiment of the present invention showing an apparatus for printing on a large surface area made in accordance with the present invention.
Figure 2:
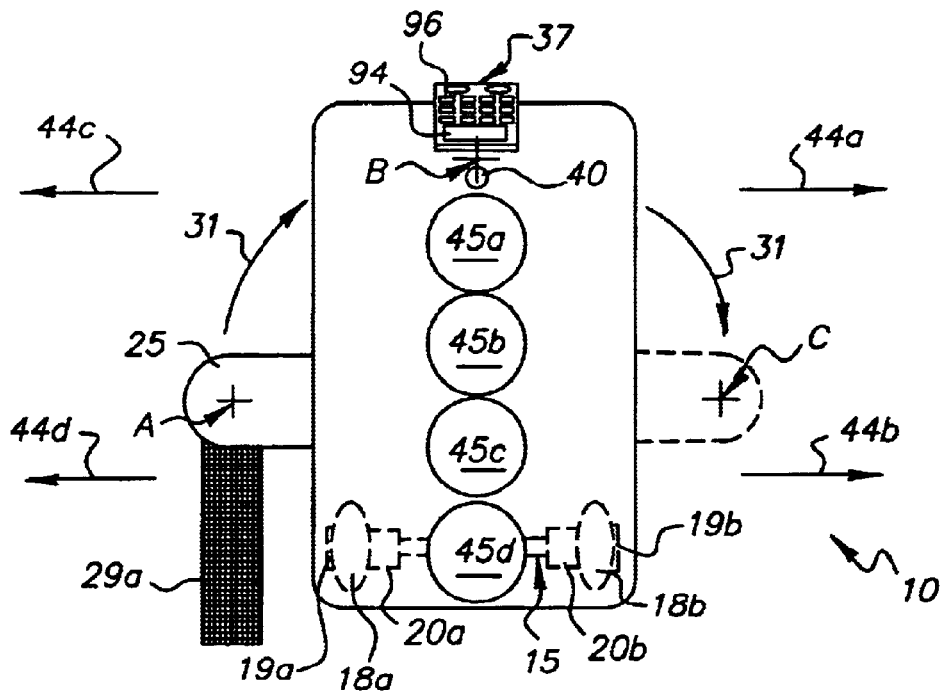
FIGS. 2 and 3 are top plan views of the apparatus of FIG. 1.
Figure 3:
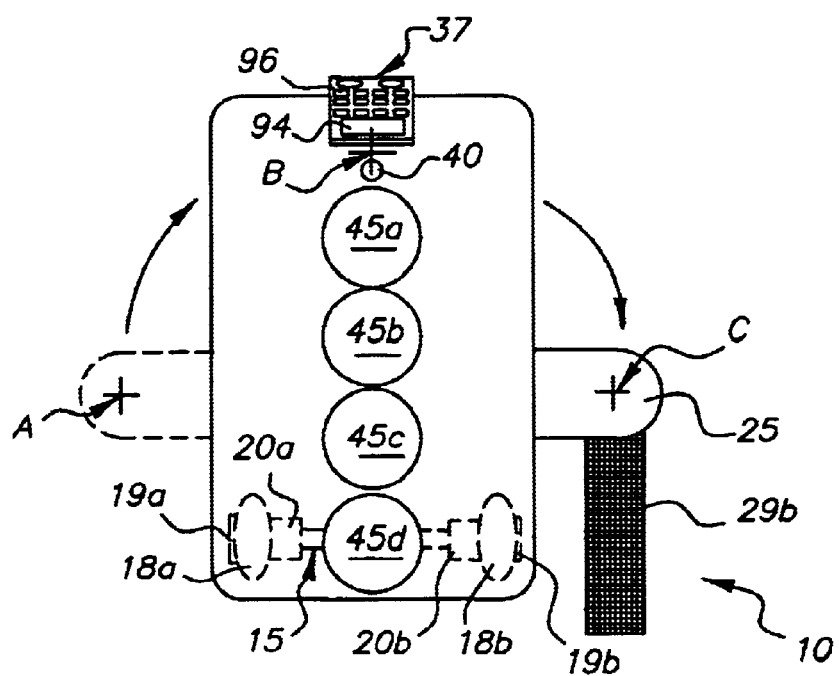
Figure 9:
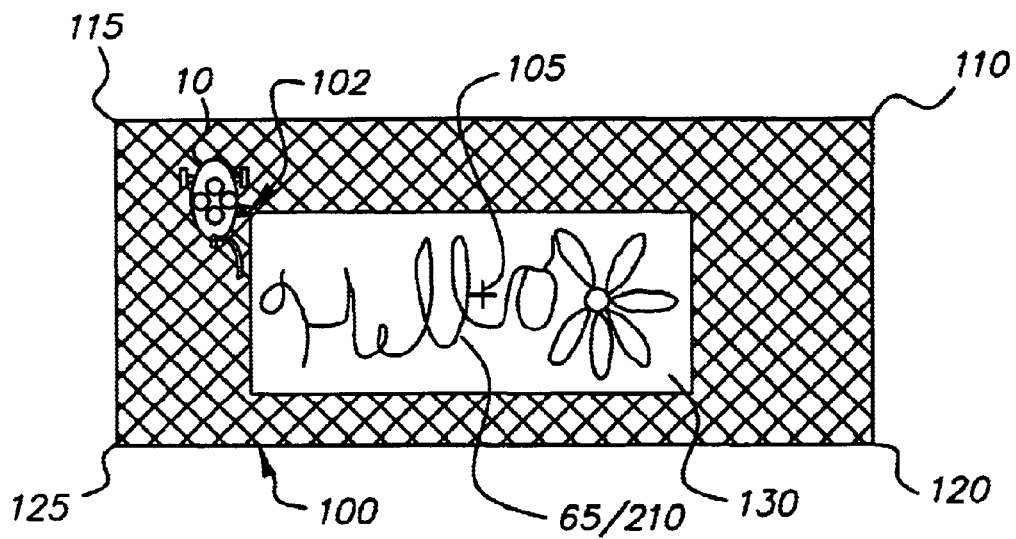
FIG. 9 is a schematic drawing of a large surface area or walkway with an image formed thereon by the apparatus illustrated in FIG. 1.

Referring to FIGS. 1, 2 and 3, apparatus 10 is a device for printing on a large surface area or walkway 100 such as a driveway and other large surface areas suited for walking upon or driving a vehicle upon as referred to above (See FIG. 9). Apparatus 10 is a wheeled vehicle that includes a propulsion assembly 15 including a set of two drive wheels 18a and 18b each with an encoder 19a and 19b, and stepper motors 20a and 20b mounted on a frame 22. Apparatus 10 also comprises a marking engine 23 with a thermo-mechanically activated DOD (Drop on Demand) print head 24, which may be a piezoelectric inkjet print head of the type disclosed in commonly assigned U.S. Pat. No. 6,295,737. Other types of inkjet print heads may also be used including thermally actuated inkjet print heads and continuous inkjet print heads.

Marking engine 23 is mounted on a sliding or rotating arm 25 having an arm positioner 26. Apparatus 10 further comprises a steerable wheel 27, a steering control 28, a power supply 30, a logic and control unit 35, a communications device 40, sensors 42a and 42b, guide finger 43 and reservoirs 45a, 45b, 45c and 45d. In this embodiment, four reservoirs are shown however there may be more or fewer reservoirs. Reservoirs 45a, 45b, 45c and 45d contain marking solutions 50a, 50b, 50c, and 50d for example, cyan, magenta, yellow and white marking solutions, respectively. In the present invention, marking solutions can be inks, dyes, paint, or pigments etc., and can form a permanent or temporary visible image. It is understood that any color or combination of colors may be used to form an image as required. Additional reservoirs and print stations may be provided for printing spot colors particularly suited for coloration of logos.

The apparatus 10 is controlled by logic and control unit 35 that includes a microprocessor and which receives instructions from various sources such as from an input panel 37, from an internal memory source (not shown), from the communication device 40, from the sensors 42a and 42b, from guide finger 43 or from an Erasable Programmable Read Only Memory (EPROM) 55, which can be inserted into the Erasable Programmable Read Only Memory (EPROM) slot 60. Other types of memory such as floppy disks, CD, CD-R, DVD, Picture Disc, memory sticks, tape, etc. may be used. The logic and control unit 35 uses instructions from the aforementioned sources to control the marking engine 23, the propulsion assembly 15, the steering control 28, the rotating arm 25 and arm positioner 26 to form an image 65 on large surface area or walkway 100 as shown in FIG. 9. The logic and control unit 35 is connected to marking engine 23, the rotating arm 25 and arm positioner 26, sensors 42a and/or 42b and positioning mechanism 62 for controlling the position of marking engine 23 in relationship to the area 100. The rotating arm 25 allows the marking engine 23 supported on the rotating arm 25 to be positioned outboard of the apparatus 10 such that when a swath 29a or 29b is printed the wheels 18 do not run over the swath 29a or 29b. As used herein the term "outboard" implies support of the print head for printing on the walkway at locations outside of the enclosed area defined by the current points of contact of the wheels (such as for example 18a, 18b and 27) which support the apparatus on the walkway. The wheels 18a, 18b and 27 may be relatively positioned on the vehicle so that they engage the surface as a tricycle would with three points of contact. The arm 25 may be rotated as indicated by the arrows 31 to positions "A", "B", or "C" depending on what is being printed. In this regard rotation of the arm 25 may be provided by a stepper motor or other mechanism attached to the arm for swinging it outboard from a storage position. In an alternative embodiment, the arm may be locked in the outboard position.

The apparatus 10 may move laterally to the right in the direction indicated by arrows 44a and 44b or to the left in the direction indicated by arrows 44c and 44d by auxiliary wheels not shown. Sensors 42a and/or 42b are disposed in sensing relationship to area 100 for sensing the vertical distance to area 100. Sensors 42a and/or 42b sense the distance to area 100, and send a signal via logic and control unit 35 to the positioning mechanism 62. The positioning mechanism 62 moves the marking engine 23 and thus print head 24 as indicated by arrow 66 (FIG. 4) maintaining constant distance between print head 24 and walkway area 100 to allow the respective multi-color ink or paint marking mediums 50a, 50b, 50c, and 50d to be applied to area 100 in accordance with the image to be formed. When apparatus 10 is in an image recording mode, printing is carried out by activating the logic and control unit 35 which in turn activates the stepper motors 20a and 20b to propel the apparatus 10 over the large surface area 100. In response to the position encoder means associated with each of the drive wheels 18a and 18b, and a print signal received by the apparatus 10, the marking engine 23 is selectively activated by the logic and control unit 35 to print the sequential printing swaths 29a or 29b.

In the preferred embodiment of the present invention, there is adopted a printing method wherein the printing operation is divided into printing a plurality of printing swaths 29a or 29b upon the large surface area 100. The plurality of printing swaths 29a or 29b are adjacent to one another and are printed in sequential order as the apparatus 10 is guided over the surface area 100. The printing may also be accomplished by printing a raster line rather than a swath, which comprises a plurality of raster lines. The printing is carried out by activating the stepper motors 20a and 20b to propel the apparatus 10 over the surface area 100. In response to the encoders 19a and 19b, sensors 42a and 42b, and a print signal received by the apparatus 10, the print head 24 is selectively activated by the logic and control unit 35 to print the sequential printing swaths 29a or 29b. In addition, to prevent apparatus 10 from rolling over a swath already printed, the apparatus 10 is controlled in accordance with programming in the logic and control unit to; laterally translate to the right in the direction indicated by arrows 44a and 44b or to the left in the direction indicated by arrows 44c and 44d by auxiliary wheels not shown, pivot around the common point 72 using the drive propulsion mechanism 15 and steering control 28 and/or move the print head 24 via the arm positioner 26 moving the arm 25 outboard of the apparatus 10 as shown in FIGS. 2 and 3. In printing of a swath multiple passes may also be provided so as to avoid printing adjacent pixels simultaneously.

Figure 4:
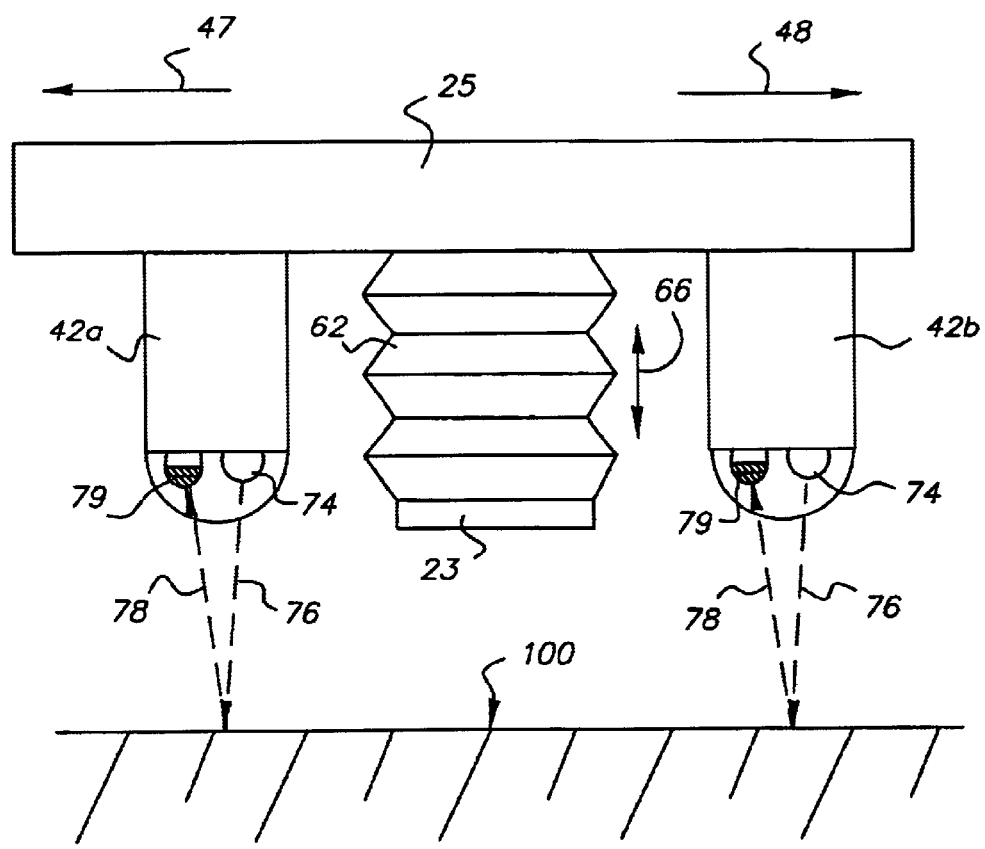
FIG. 4 is a view in elevation of a portion of the apparatus of FIG. 1 and showing one embodiment of the present invention showing a sensor comprising a laser system for measuring distance to a surface from the print head.

Referring to FIG. 4, sensor 42a and/or 42b is preferably a laser system comprising a photodiode light source 74 capable of emitting a laser light beam 76 to be intercepted by area 100 and reflected therefrom to define a reflected light beam 78. In such a laser system, sensors 42a and/or 42b further comprises a light detector 79, which may be a CCD (Charged Couple Device) associated with light source 74 for detecting reflected light beam 78. In this regard, the laser system comprising light source 74 and detector 79 may be a modified "IMPULSE"™ model laser system available from Laser Technology, Incorporated located in Englewood, Colo. In addition to sensing the distance from the print head 24 to the area 100 sensors 42a and/or 42b may be used to determine the relative color of the area to be printed for example white concrete or black asphalt. The mechanism for adjusting the position of the print head relative to the walkway surface area 100 may be a bellows type mechanism or telescoping-like or piston-like mechanism.

Figure 5:
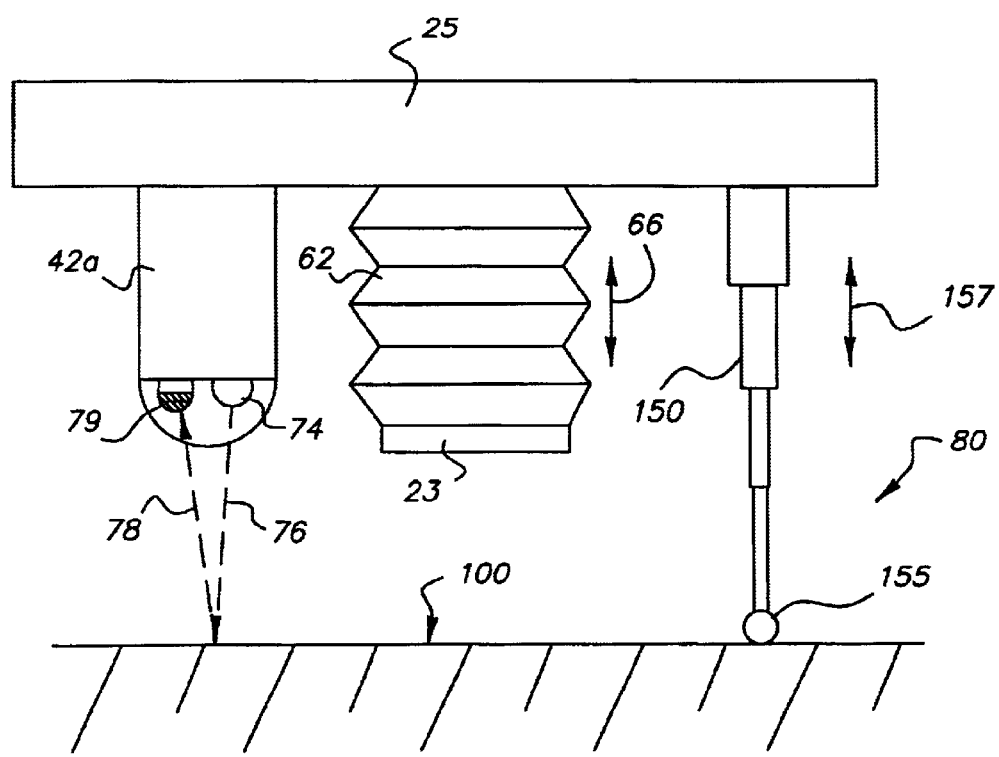
FIG. 5 is a view in elevation similar to that of FIG. 4 but illustrating another embodiment of the present invention showing a sensor comprising a mechanical follower for measuring distance to the surface from the print head for use in the apparatus of the invention.

Referring to FIG. 5, as another embodiment of the present invention, sensor 80 is a mechanical follower mechanism comprising a telescoping spring-loaded follower 150 having an end portion 155 (e.g., a rollable ball bearing) adapted to contact area 100 and follow there along. In this case, telescoping follower 150 is capable of extending and retracting as indicated by arrow 157 in order to follow contour of area 100, and is also capable of generating an electrical signal indicative of the amount follower 150 extends and retracts with respect to area 100. It should be appreciated that sensor 80 and print head 24 need not be pointing at the same location on area 100 as long as the initial position of sensor 80 relative to the initial position of print head 24 is known at the start of the mapping process.

Figure 6:
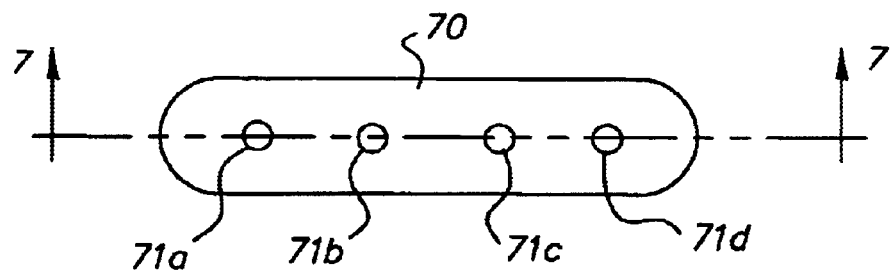
FIG. 6 is a fragmentary view showing a multiple color print head forming a part of the apparatus of FIG. 1.
Figure 7:
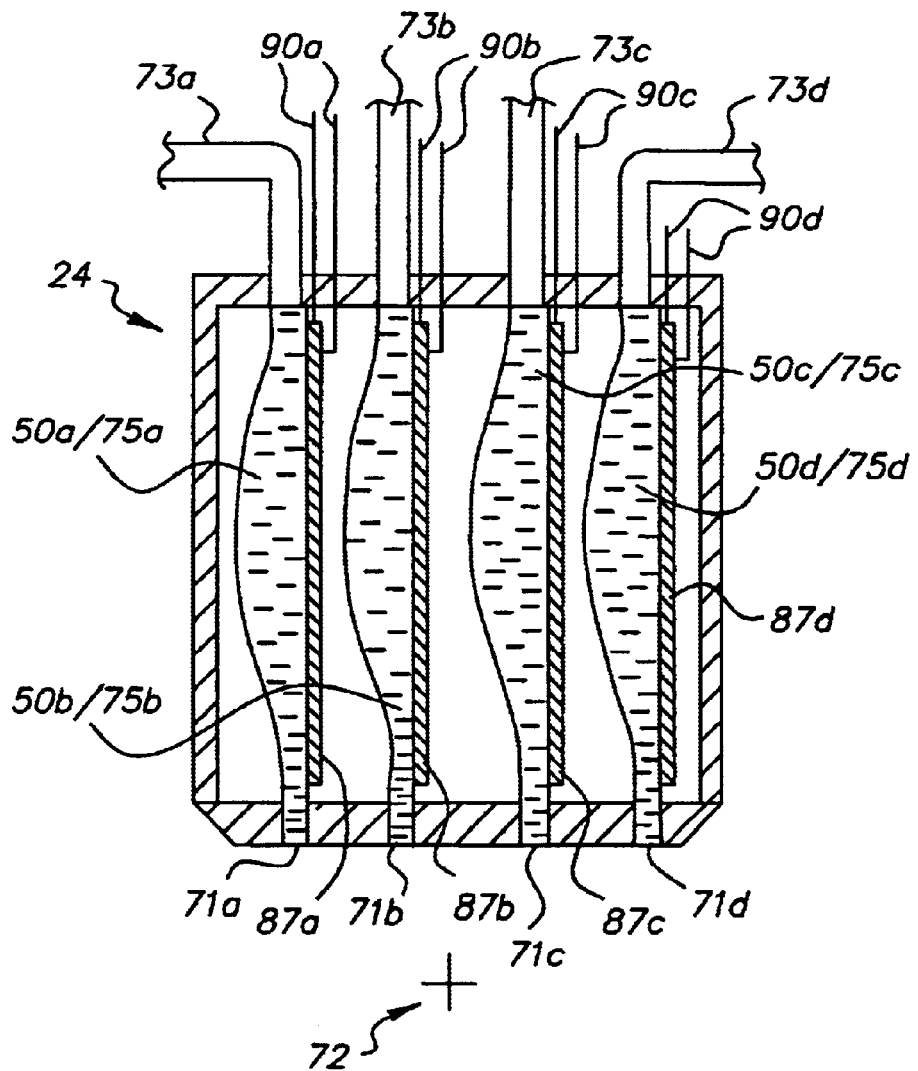
FIG. 7 is a cross-sectional view of the multiple color print head of FIG. 6 as taken along line 7—7 of FIG. 6.

Referring now to FIG. 6, print head 24 (see FIG. 1), which in this embodiment is a DOD inkjet print head comprises a plate 70 having a plurality of nozzles 71a, 71b, 71c, and 71d. As previously discussed in FIG. 1 like numerals indicate like parts and operations. Each of the nozzles is capable of ejecting a drop 88 (see FIG. 8) of marking solution 50a therefrom to be intercepted by the large surface area 100. Referring to FIG. 7, there is illustrated a cross-sectional view of the print head 24 as taken along line 7—7 of FIG. 5. Nozzles 71a, 71b, 71c, and 71d are connected to channel-shaped chambers 75a, 75b, 75c and 75d. The chambers 75a, 75b, 75c and 75d are in liquid flow communication with respective reservoirs 45a, 45b, 45c and 45d shown in FIG. 1 via flexing tubing lines 73a, 73b, 73c, and 73d respectively. In this manner, respective color marking solutions of color ink or paint flow through respective tubing lines 73a, 73b, 73c, and 73d and into respective chambers 75a, 75b, 75c and 75d. In addition, each of the nozzles 71a, 71b, 71c, and 71b defines a nozzle orifice 81a, 81b, 81c, and 81d communicating with chamber 75a, 75b, 75c and 75d respectively for flow of the respective liquid to the respective nozzle orifice.

Figure 8:
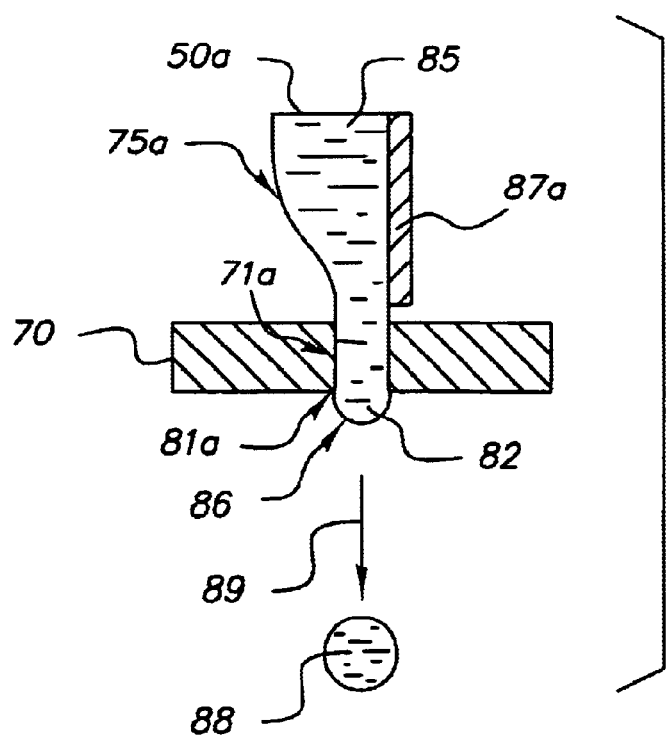
FIG. 8 is an enlarged view of a nozzle of the print head of FIGS. 6 and 7.

Referring now to FIG. 8, which is an enlargement of the nozzle 71a of FIG. 7. As the marking solution flows into chamber 75a a marking solution body 85 is formed. A marking solution meniscus 82 is disposed at orifice 81a when marking solution body 85 is disposed in chamber 75a. In this position of marking solution meniscus 82, marking solution meniscus 82 has a surface area 86. By way of example only and not by way of limitation, orifice 81a may have a radius of approximately 60 $\mu$m. When a voltage is applied to piezoelectric transducer 87a, drop 88 of marking solution 50a is ejected from nozzle 71a in the direction of arrow 89.

Referring again to FIG. 7, the plurality of nozzles 71a, 71b, 71c, and 71d are pointed at the common point 72 so that varying colors can be created with a single pass of the print head 23. The marking engine 23 may comprise more than one print head 24. The controls for the multihead print head can also be programmed to provide for color marking of adjacent spots or spots somewhat spaced from each other. The amount of marking solution 50a, 50b, 50c, and 50d amount may range in drop size from 32 Pico liters to 300 Pico liters depending on the amount of coverage, resolution in dots per inch and the time to print desired. For example, using a drop size of 128 Pico liters and a resolution of 150 pixels per inch a six foot by six foot image may be printed in approximately four and one half minutes or at a print rate of approximately 500 square feet per hour. The amount of coverage also depends of the characteristics of the surface being covered. The coarser the surface the greater the coverage required. The multiple colors for a pixel may not exactly overlap but can have some overlap or else a close positioning relative to each other. The print head 24 is capable of marking in any number of colors including the complementary color sets such as cyan, magenta, and yellow. When mapping the area 100 (the mapping process is described later with reference to FIG. 15), sensors 42*a* and/or 42*b* detect the color and characteristic of the surface of area 100. For example, if the apparatus 10 were printing on grass the surface color would be predominantly green. The logic and control unit 35 would indicate to the user via the display 37 what color marking solution is needed. Likewise, the processor is programmed to determine the predominant color of the surface, and indicates to the user whether or not or how much of a background color is to be painted on the area before printing the image.

The coarseness of the surface can be determined by how the distance from the surface to the print head varies in relation to linear distance traveled. In the case where the sensors 42*a* and/or 42*b* sense a dark surface such as asphalt driveway, a supplementary white color may be applied to the area 100 before the cyan, magenta and yellow is applied to create the image 65. Alternately in the case where the sensors 42*a* and/or 42*b* sense a light surface such as concrete a supplementary black color may be added similar to a desktop inkjet printer applying cyan, magenta, yellow and black. When the sensors sense a particular color surface, the printing algorithm in the logic and control unit 35 can automatically adjust the amount of cyan, magenta, yellow, black or white marking solution based on look up tables that have been heuristically determined. Depending on what surface a user desires to mark, any number of colors deemed appropriate for generation of full-color images can be used.

Therefore, referring to FIG. 1, the apparatus 10 is controlled by logic and control unit 35, which receives directions from the input panel 37 (see FIG. 10) and image data from an external memory source such as computer not shown, from the communication device 40 such as an RF receiver and transmitter, from an internal memory source such as the EPROM 55, inserted into the EPROM slot 60 or from the logic and control unit 35 itself. The logic and control unit 35 is in communication with the marking engine 23 and print engine 24 via lines 90*a*, 90*b*, 90*c*, and 90*d*. Using the nozzles 71*a*, 71*b*, 71*c*, and 71*d*, marking engine 15 can create a color image 65 on the large area or walkway 100 as shown in FIG. 9.

Referring to FIG. 9, using encoders 19*a* and 19*b* (see FIGS. 2 and 3) and mapped image 65 (the mapping process is described later with reference to FIG. 15) the apparatus 10 returns to the starting position 102 at "X" to begin the printing process. The logic and control unit 35 is electrically coupled by means of suitable power boosting control electronics to the propulsion assembly 15 and steering control 28 for selectively activating the stepper motors 20*a* and 20*b* and steering control 28, thereby rotating the drive wheels 18*a* and 18*b* and propelling the apparatus 10 over the large surface area 100. For example, the propulsion assembly 15 is activated by receiving electrical pulses from the logic and control unit 35. In response to each of the electrical pulses, the stepper motors 20*a* and 20*b* each rotates a fraction of a revolution. In response to rotation of the stepper motors 20*a* and 20*b*, each of the drive wheels 18*a* and 18*b* may rotate independently. The set of drive wheels 18*a* and 18*b* frictionally engages the top surface of the area 100 as each of the wheels rotates, thereby propelling the apparatus 10 over the area 100. The steering wheel 27 operates together with the drive wheels 18*a* and 18*b* to guide the apparatus 10. The encoders 19*a* and 19*b* and sensors 42*a* and 42*b* monitor the position and orientation of the apparatus 10 relative to the area 100 and portion of the image 65, which has already been printed. When printing in the direction indicated in FIG. 4 by arrow 47, sensor 42*a* is active. When printing in the direction indicated by arrow 48, sensor 42*b* is active. Both sensors 42*a* and 42*b* may be active at the same time and may perform different functions such as one sensor sensing the image that has already been printed, while the other senses the distance to the surface.

The logic and control unit 35 counts the number of electrical pulses sent to the stepper motors 20*a* and 20*b* and steering control 28. It should be noted that the present invention is not limited in the use of a stepper motor and steering control since other types of electric motors can be substituted and controlled by electric signals from the logic and control unit 35 with beneficial results. Accordingly, the encoder can be alternatively embodied, for example, by software which programs the logic and control unit 35 to count a number of electrical pulses respectively generated by shaft rotation encoders respectively coupled to each of the rolling members.

Figure 10:
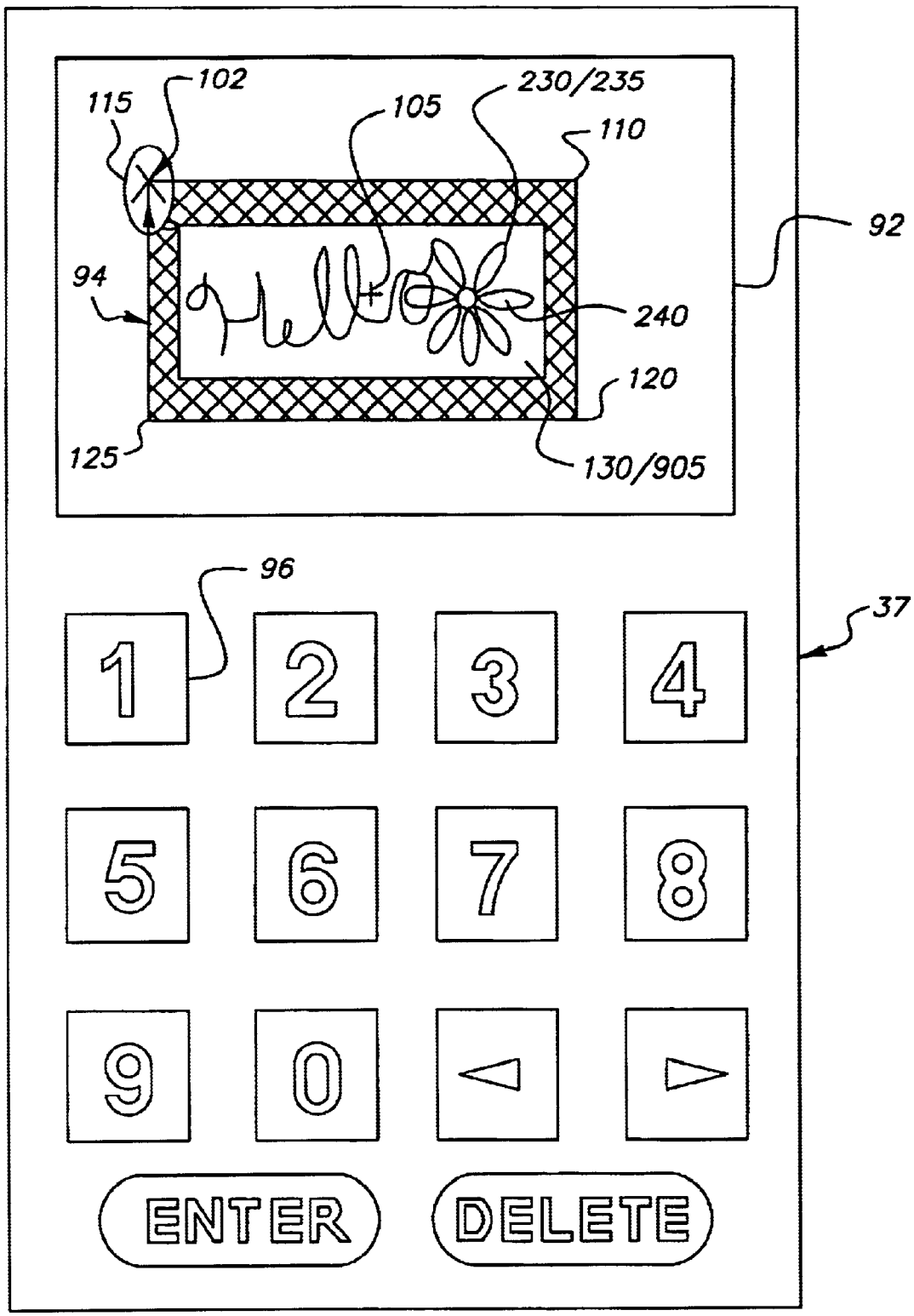
FIG. 10 is a schematic of an input panel of the apparatus illustrated in FIG. 1.

Referring to FIG. 10, the input panel 37 comprises a display 92, which via a fiducial 94 shows the position of the apparatus 10 in relation ship to the large area or walkway 100, and a keyboard 96 for inputting instructions. The display 92 may be a touch screen.

Figure 11:
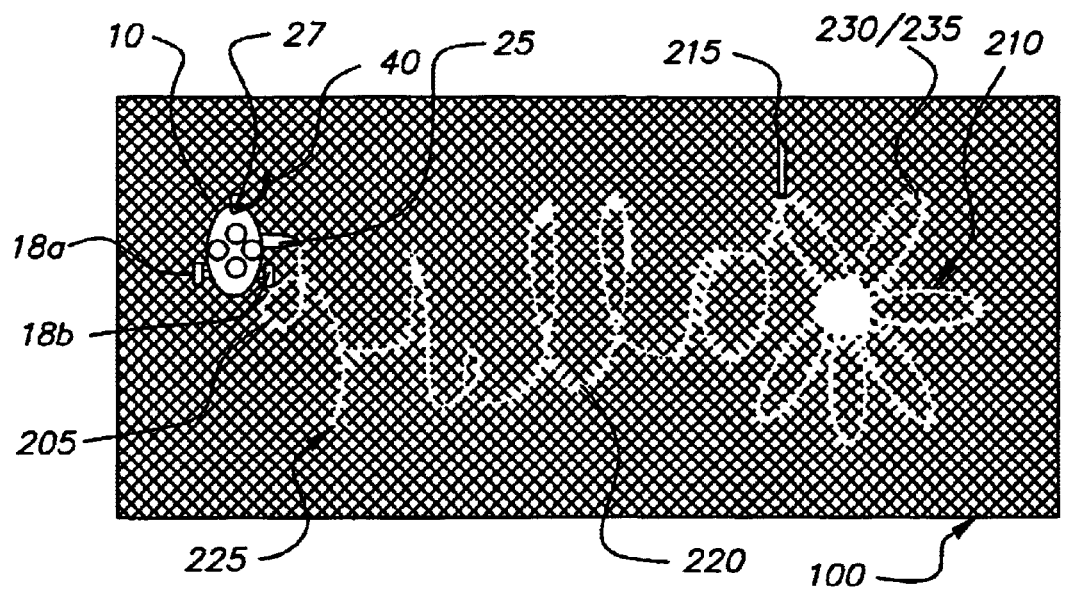
FIG. 11 is a schematic drawing of a large surface area or walkway with a crude image formed by use of a handheld marker thereon made in accordance with another embodiment of the invention.
Figure 12:
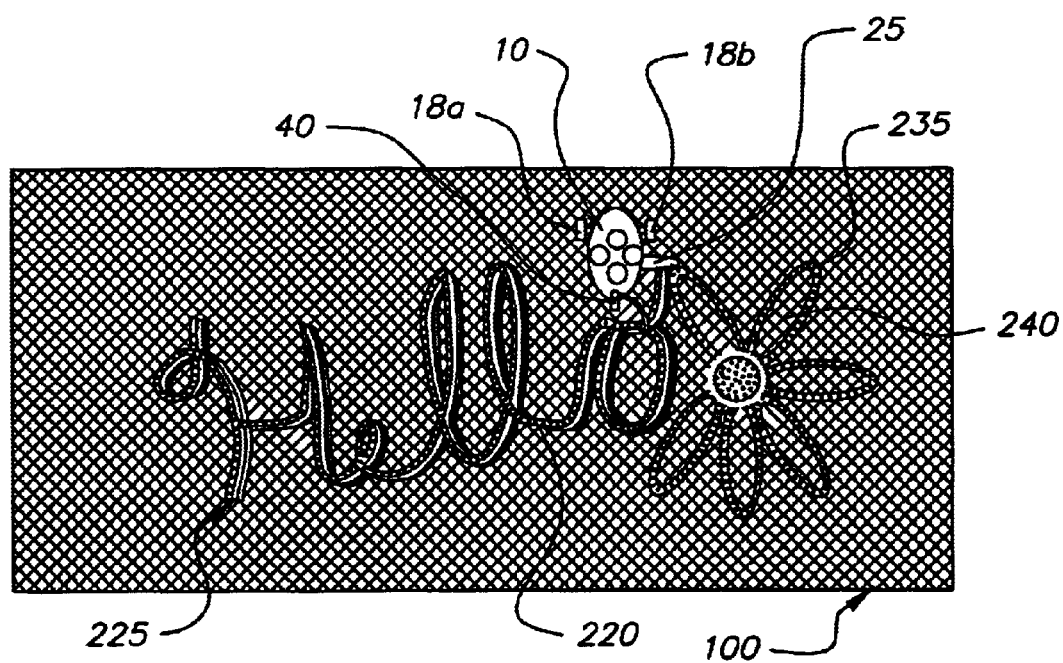
FIG. 12 is the schematic drawing of FIG. 11 with the image printed by the apparatus illustrated in FIG. 1.

Referring now to FIGS. 11 and 12, a line or boundary 205 defining the outline 230 of a crude image 210 is drawn on the large surface area or walkway 100 using a handheld marker 215, which applies a material 220 such as a fluorescent dye, iron oxide, or a colorant, which is detected by the sensor 42*a* and/or 42*b* shown in FIG. 1. The marker 215 is used to draw the line 205, which can be a word 225, or a graphic 235, etc. Using the signal produced by the sensor 42*a* and/or 42*b* as it tracks the material 220, the logic and control unit 35 controls the marking engine 23, the propulsion assembly 15, and the steering mechanisms 28 to colorize the line 205 representing the word 225 or fills in the graphic 235 completing the outline 230 to form the image 210 as the apparatus 10 follows the material 220. Referring again to FIG. 10, when colorizing the line 205, filling in the outline 230 or the graphic 235 etc., the apparatus 10 follows the instructions provided by the user through the input panel 37.

Referring now to FIGS. 11 and 12, in another embodiment the user indicates what colors are to be printed by using different hand color markers to 15 which indicate what color(s) to use to draw the line or boundary 205, defining the outline 230 of the crude image 210. If the user would like an area 240 inside the outline 230 filled in with a different color, the user can mark using the hand color marker the area 240 inside the outline 230 with the color the user would like the apparatus 10 to print.

Figure 13:
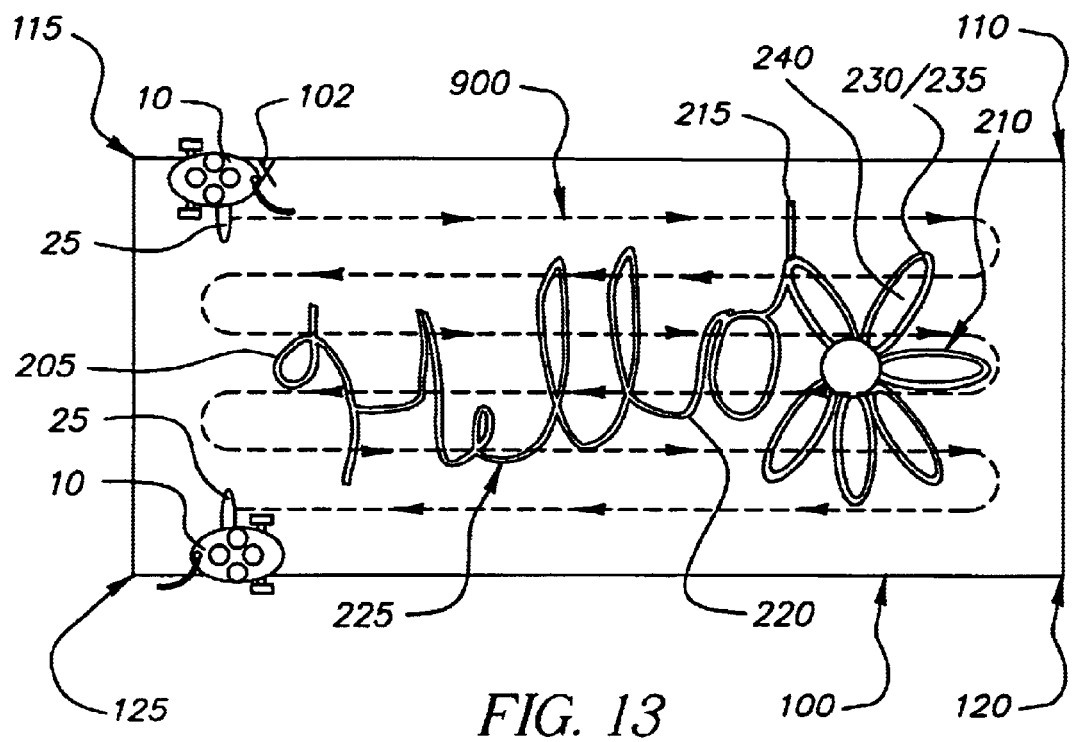
FIG. 13 is the schematic drawing of FIG. 11 with the image formed thereon by use of a handheld marker being scanned in a raster pattern by the apparatus of FIG. 1.

In still another embodiment, the apparatus 10 using the sensor 42*a* and/or 42*b* to sense the line 205 previously created by the hand marker 215 maps the large surface area or walkway 100 where the line 205 is drawn (the mapping process is described later with reference to FIG. 15). The map 130 of the large surface area or walkway 100 and line 205 and/or outline 230 is stored in the internal memory of the logic and control unit 35 and can be displayed on the input panel 37 as shown in FIG. 10. The map 130 of the large surface area or walkway 100 and line 205 and/or outline 230 can be transmitted via the communications device 40 shown in FIG. 1 and displayed on a computer monitor, PDA or other external display not shown. The user using input panel 37 or in the case of the external computer or display a mouse, stylus or touch screen can input the desired colors to be used by the apparatus 10 by touching the portions of the line 205 and/or outline 230 on the area 240 displayed map 130 with the desired color. Referring now to FIG. 13 the line 205 representing the boundaries or outline 230 of crude image 210 is drawn on the large surface area or walkway 100 using the handheld marker 215. As before the marker 215 applies material 220, which can be detected by the sensor 42a and/or 42b shown in FIG. 1. In this embodiment the apparatus 10 crisscrosses the line 205 or outline 230 in a raster scan pattern 900 scanning the line 205 or outline 230. As discussed previously the user may indicate what colors are to be printed by using different color markers to drawn the line or boundary 205, defining the outline 230 of a crude image 210 and what color is to be used to fill in the area 240 of the image 210. Using the image data values produced by the sensor 42a and/or 42b as the apparatus 10 scans the line 205 or outline 230 the logic and control unit 35 maps the line 205 or outline 230 creating an image raster map 905 (see FIG. 14) of the crude image 210. The logic and control unit displays the image raster map 905 on the input panel 37 or a computer screen not shown as previously discussed.

Figure 14:
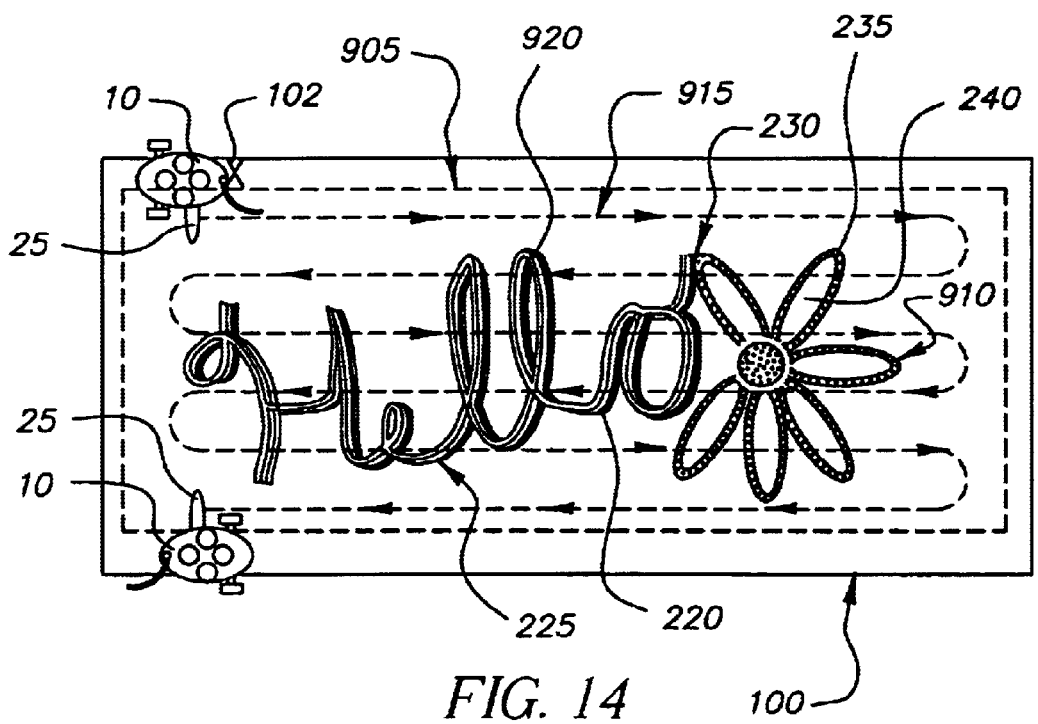
FIG. 14 is the schematic drawing of FIG. 13 with the image printed by the apparatus illustrated in FIG. 1.
Figure 15:
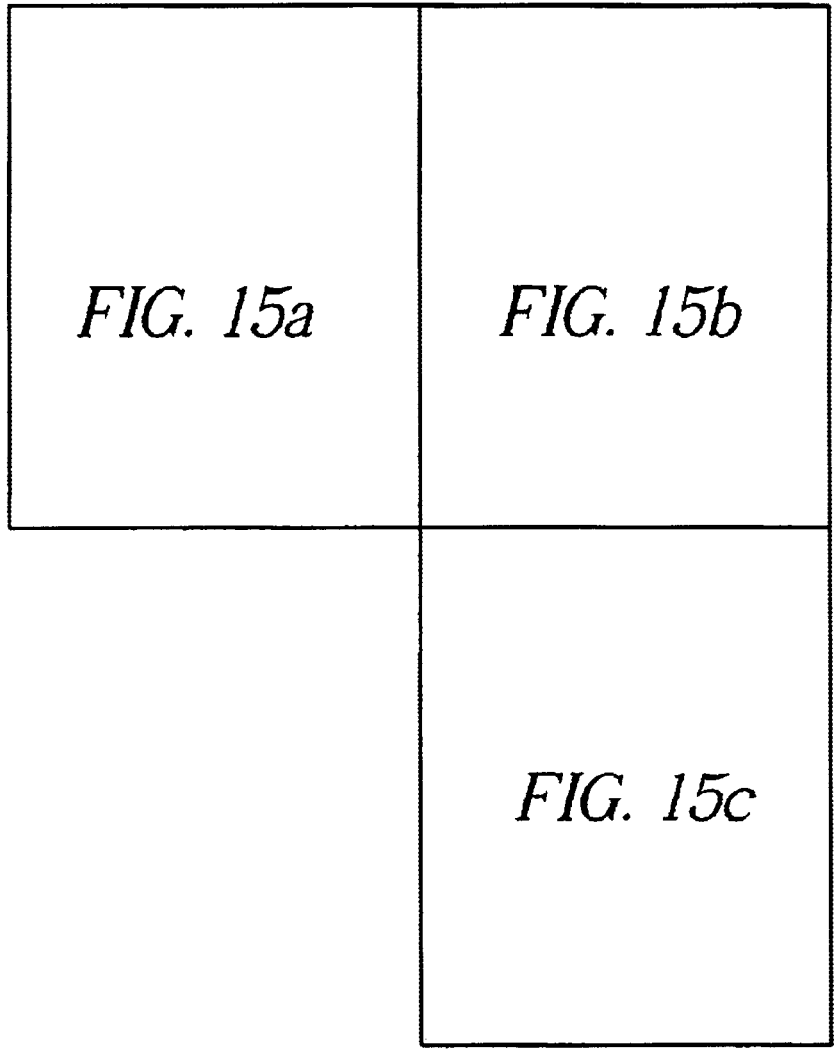
FIGS. 15, 15a, 15b and 15c are a logic flowchart of a process for mapping an image onto a large surface area or walkway in accordance with the invention.
Figure 15A:
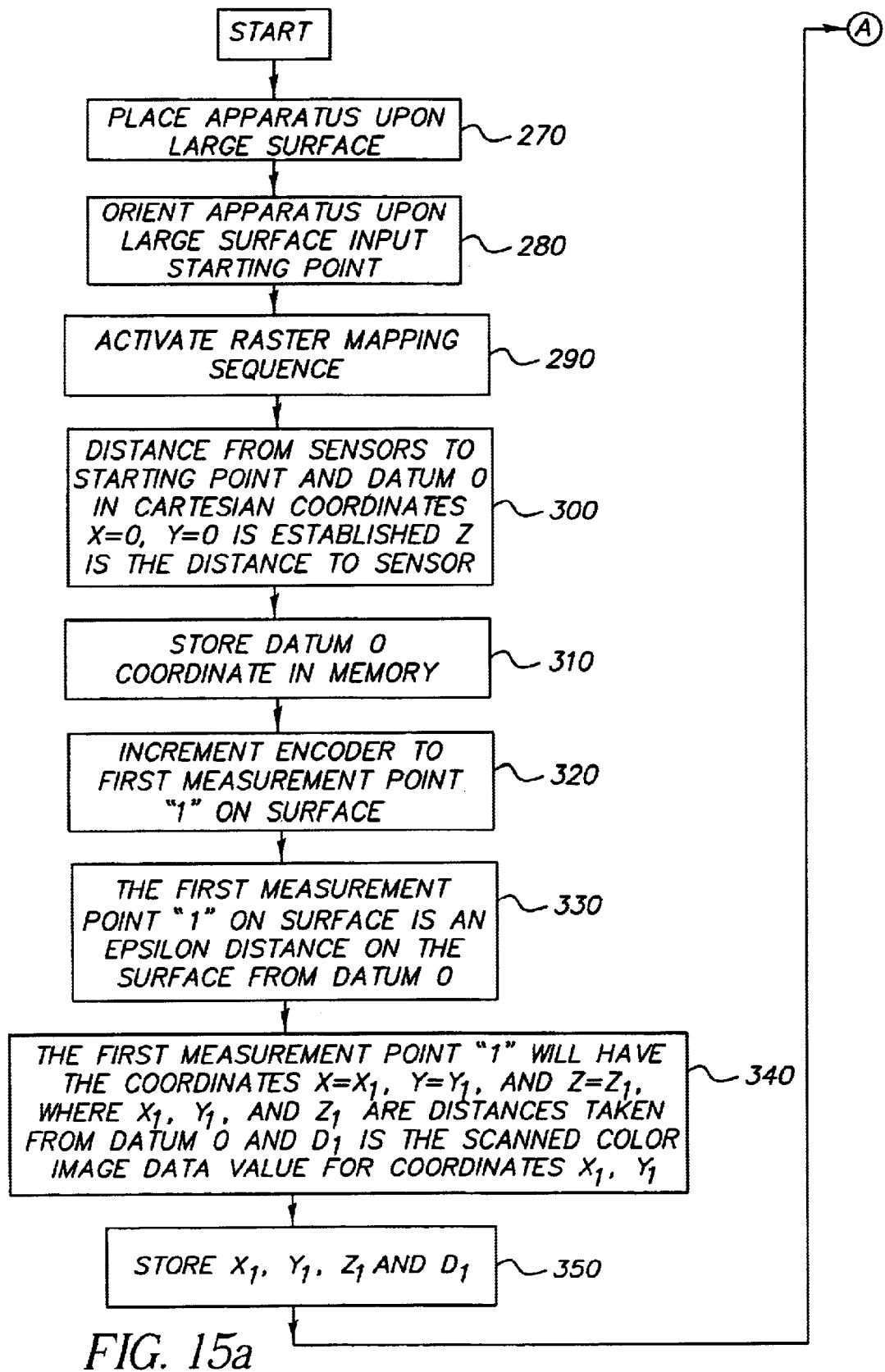
Figure 15B:
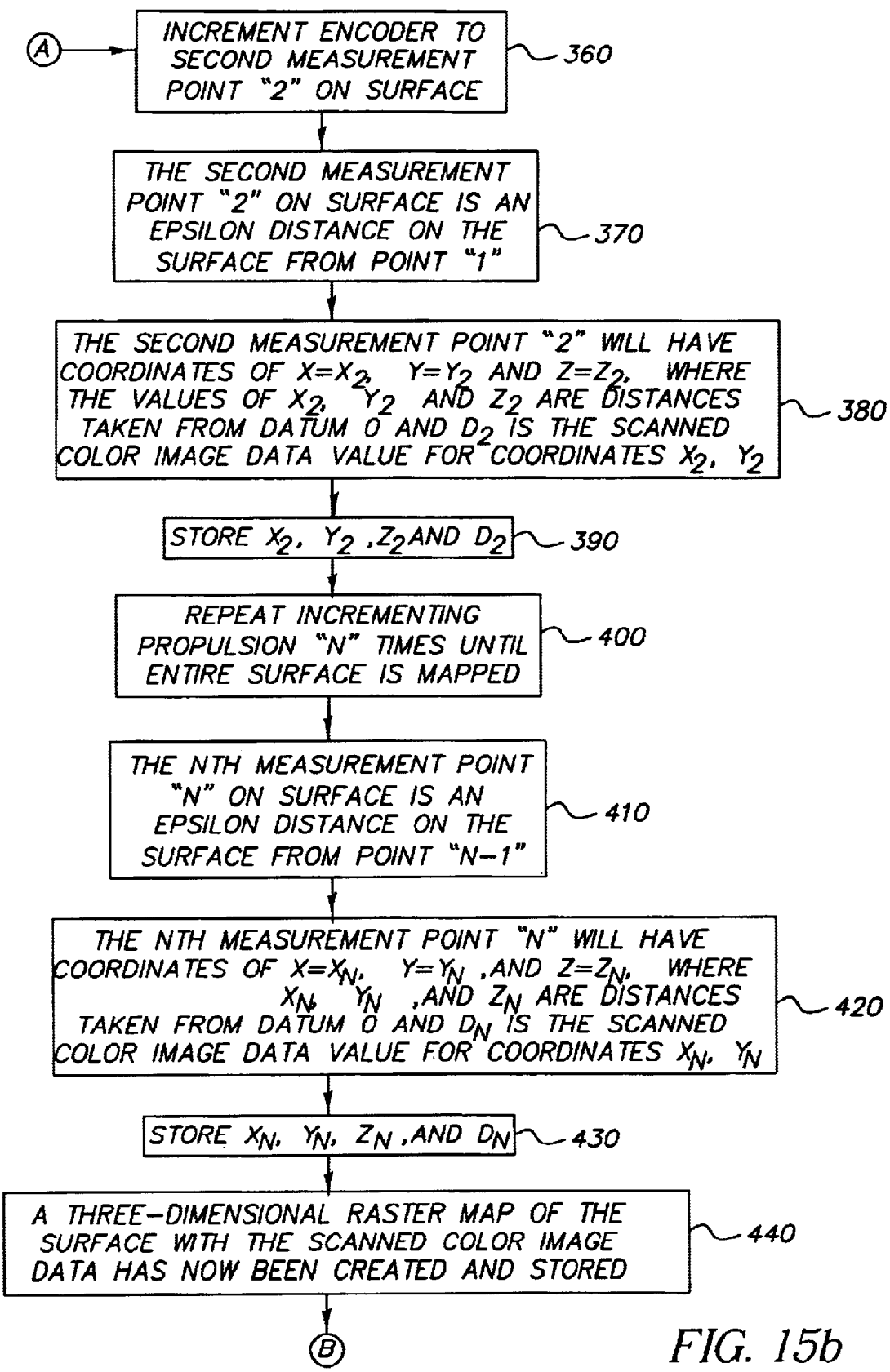
Figure 15C:
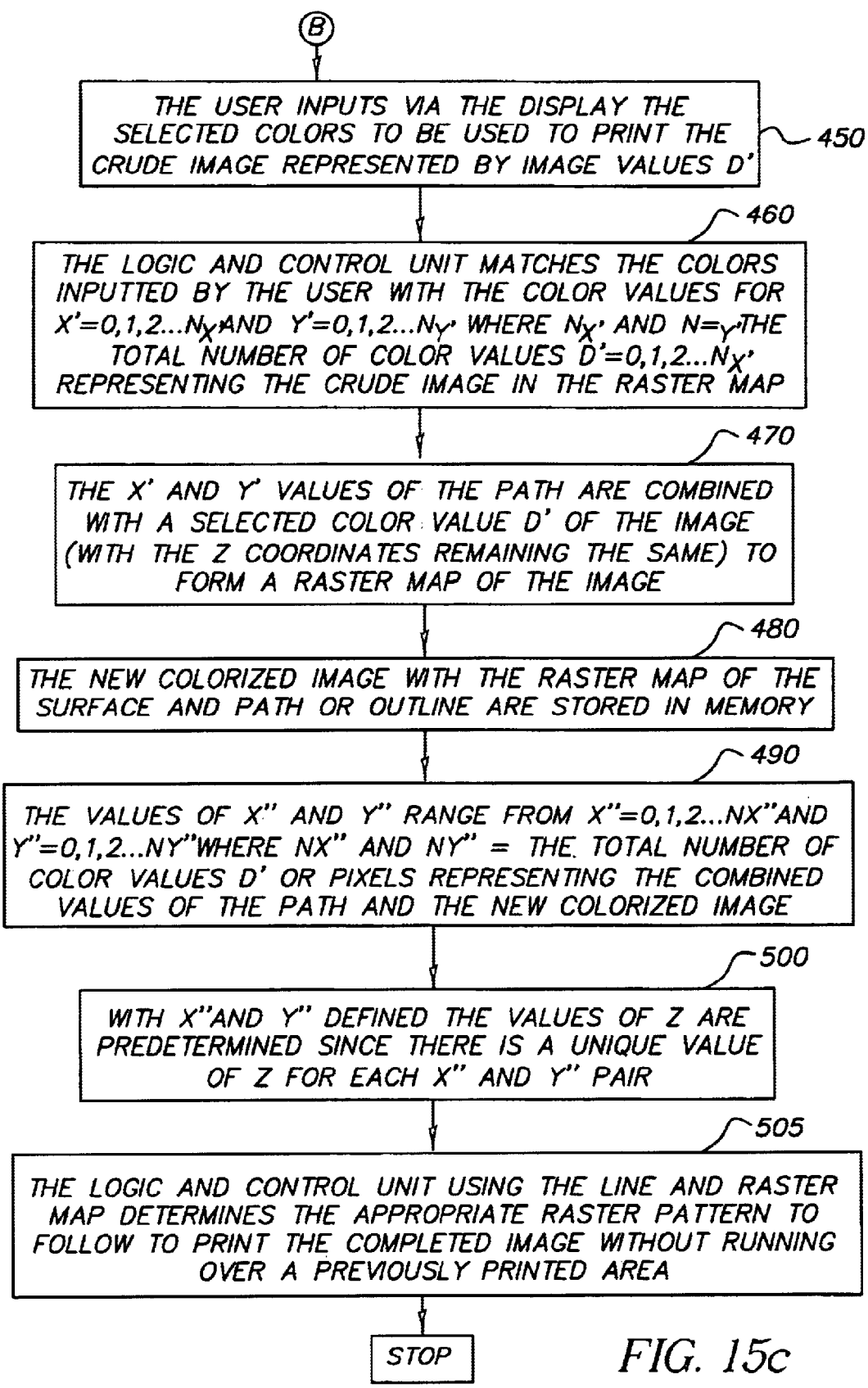

Now referring to FIG. 14, the logic and control unit 35 using the image raster map 905 controls the marking engine 23, the propulsion assembly 15, and the steering mechanisms 28 to add selected colors to print the crude image 210 to form a colorized completed image 910. By using the line 205 or outline 230 and the raster map 905 the logic and control unit 35 determines the appropriate raster pattern 915 to follow to print the completed image 910 without running over a previously printed area 920. The method described above can similarly be used when filling in the word 225 or the graphic 235 etc.

Referring again to FIGS. 13 and 14, in another embodiment the logic and control unit 35 can use the raster map 905 to determine the appropriate raster pattern 915 to follow when printing in order to minimize running over previously printed areas 920. In yet another embodiment of the present invention, the logic and control unit 35 can use the raster map 905 to smooth out any irregularities in the line 205 or outline 230 during the printing process. Methods used for line smoothing are well known to those skilled in the art.

Therefore, referring to FIGS. 1, 9, 10, 11, 12, 13, 14, 15a, and 15b the manner in which area 100 and the drawn line 205 or outline 230 in relationship to the crude image 210 is mapped into x, y and z Cartesian coordinates will now be described. After drawing the line 205 or outline 230, the apparatus 10 is placed upon the large surface area 100 by the user at Step 270. The user then records the orientation of the apparatus 10 on the large area 100 by inputting, via the input panel 37, the location of the starting position 102 at "X" of the apparatus 10. For example, the starting position 102 is located at the top right 110, but can be the top left 115, lower right 120 or lower left 125 position at Step 280. The starting position is chosen such that the apparatus 10 can travel over the line 205 or outline 230 in the raster scan pattern 900. If the user chooses to randomly position the apparatus 10 any where along the line 205 or outline 230, the apparatus would then scan area 100 to determine the location of the line 205 or outline 230 and then choose an appropriate point to begin the raster scan pattern 900. The user activates the mapping sequence Step 290. Next, the logic and control unit 35 activates sensors 42a and 42b and encoders 19a and 19b. That is, the logic and control unit 35 effectively determines the location of the line 205 or outline 230 in the large surface area 100 from sensors 42a and 42b by scanning using the raster scan pattern 900. Distance of this initial point is determined either by use of light beams 76/78 or follower 155 and encoders 19a and 19b. This initial point is designated as a datum point "0" and will have Cartesian coordinates of x=0, y=0 and z=distance from sensor 42a and 42b as at Step 300. The x, y and z coordinates for datum point "0" are sent to logic and control unit 35 and stored therein as at Step 310. Logic and control unit 35 then activates propulsion assembly 15 to increment drive wheels 18a and 18b and encoders 19a and 19b a predetermined amount following the raster scan pattern 900 in order to sense a first measurement point "1" on area 100 as at Step 320. This first measurement point, "1" is located at an epsilon or very small distance "δ" on area 100 in a predetermined direction following raster scan pattern 900 from datum point "0" as at Step 330.

Moreover, this first measurement point "1" will have coordinates of $x=x_1$, $y=y_1$, and $z=z_1$, where the values of $x_1$, $y_1$, and $z_1$ are distances defining location of measurement point "1" from datum point "0" and a scanned color image data value $d_1$ for point $x_1$, $y_1$, in the well-known three-dimensional Cartesian coordinate system as illustrated by Step 340. The coordinates and color image data value $d_1$ of measurement point "1" are sent to logic and control unit 35 and stored therein as at Step 350. Logic and control unit 35 then activates propulsion assembly 15 to increment drive wheels 18a and 18b and encoders 19a and 19b epsilon distance "δ" to a second measurement point "2" on area 100 as at Step 360. That is, this second measurement point "2" is located at the epsilon distance "δ" on area 100 in a predetermined direction from first measurement point "1" following raster scan pattern 900 as illustrated by Step 370. Moreover, this second measurement point "2" will have coordinates of $x=x_2$, $y=y_2$ and $z=z_2$, where the values of $x_2$, $y_2$ and $z_2$ are distances defining separation of measurement point "2" from datum point "0" and the scanned color image data value $d_2$ for point $x_2$, $y_2$ in the three-dimensional Cartesian coordinate system as illustrated by Step 380. These coordinates of second measurement point "2" and color image data value $d_2$ are sent to logic and control unit 35 and stored therein as at Step 390. In similar manner, logic and control unit 35 activates propulsion to assembly 15 to increment drive wheels 18a and 18b and encoders 19a and 19b by increments equal to epsilon distance "δ" about the entire area 100 to establish values of x=0, 1, . . . $n_x$; y=0, 1, . . . $n_y$; and z=0, 1, 2, . . . $n_z$, where $n_x$, $n_y$ and $n_z$ equal the total number of measurement points to be taken on area 100 in the x, y and z directions and image data values of d=0, 1, . . . $n_d$, where nd equals the total number of image data values taken on area 100 in the x, y direction following the raster scan pattern 900 respectively as at Step 400. Each measurement point is spaced-apart from its neighbor by epsilon distance "δ" as illustrated by Step 410. In this manner, all measurement points describing area 100 and color image data values describing the line 205 or outline 230 following raster scan pattern 900 are defined relative to initial datum point "0", which is defined by x=0, y=0 and z=distance from sensor 42a and 42b as illustrated by Step 420. The process disclosed hereinabove results in a three-dimensional image raster map 905 of area 100 and the line 205 or outline 230 being stored in logic and control unit 35 as x, y and z coordinates as at Steps 430 and 440.

Referring again to FIGS. 1, 9, 10, 11, 12, 13, 14, and 15*c*, the user inputs via the display 37 the selected colors to be used to print the crude image 210 represented by image values d' as at Step 450. The logic and control unit 35 performs a calculation matching the selected colors inputted by the user with the crude image 210 stored therein with the x, y and z image raster map 905 of area 100 as at Step 460. The x' and y' values of the line 205 or outline 230 are combined with a selected color value d' of the crude color image 210 (with the z coordinates remaining the same) to form the raster map of the image 905 as at Step 470. The new calculated image with the image raster map 905 of the surface 100 and line 205 or outline 230 represented therein in the form of a plurality of color points defined by x' and y' two-dimensional Cartesian coordinates are stored in the logic and control unit as at Step 480. That is, after logic and control unit 35 combines the color values d' of the line 205 or outline 230 for each x' and y' value with the selected color values, the logic and control unit 35 generates corresponding x" and y" values (with the z coordinate values remaining undisturbed). The x" values range from x"=0, 1, 2, . . . $n_x$, and the y" values range from y"=0, 1, 2, . . . $n_y$, where $n_x$ and $n_y$ equal the total of color values or pixel points representing the newly completed colorized image 910 in the x" and y" directions, respectively as illustrated by Step 490. It should be understood from the description hereinabove, that once the values of x" and y" are defined, the values of z are predetermined because there is a unique value of z corresponding to each x" and y" pair as illustrated by Step 500. The values x" and y" may represent a smoothing of the crude image that was formed with the hand marker using a smoothing algorithm and a sensed color of continuous lines.

The logic and control unit 35 using the line 205 or outline 230 and the image raster map 905 controls the marking engine 23, the propulsion assembly 15, and the steering mechanisms 28 determines the appropriate raster pattern 915 to follow to print the newly completed colorized image 910 without running over a previously printed area 920 as at Step 505.

Figure 16:
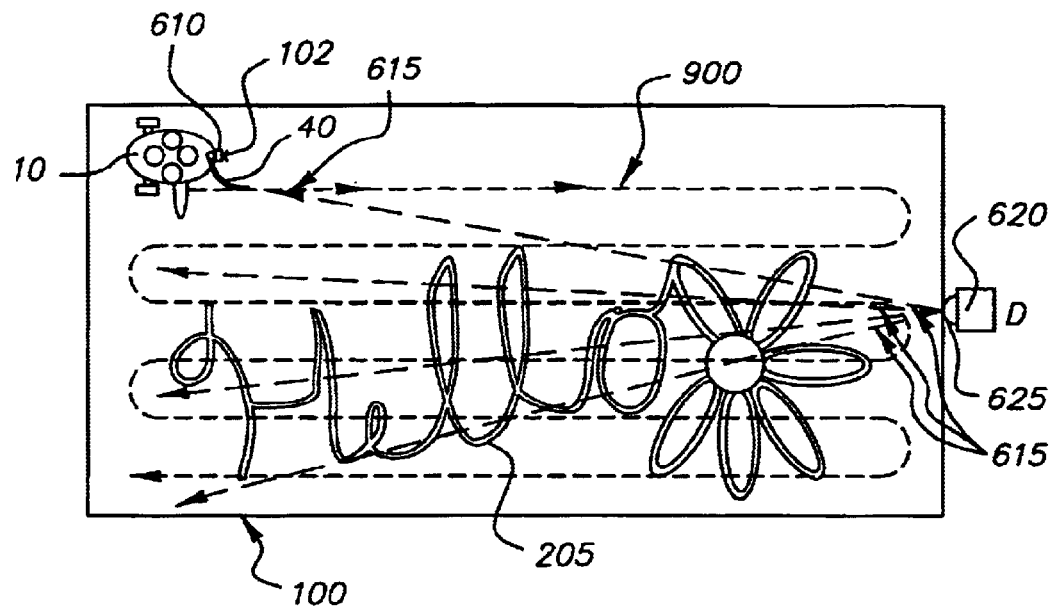
FIG. 16 is a schematic drawing of a large surface area or walkway with an image formed thereon by use of a laser beam and the apparatus of FIG. 1.

Now referring to FIG. 16 in another embodiment of the present invention, apparatus 10 may be equipped with a reflector 610, which is used to reflect a scanning laser beam 615 from a laser 620 back to a sensor 625. The laser is placed at position "D" and aligned to the starting position 102 at "X" on the large surface area 100. After the laser 620 is positioned, the apparatus 10 using the reflector 610 thereon, communications device 40 mounted on apparatus 10, laser beam 615 and scanning reflector 625 determines its location on the large area 100, maps the area 100 and line 205 or outline 230 by traveling over the area 100 in the raster scan pattern 900. Following the mapping as has been previously discussed, the logic and control unit 35 using the line 205 or outline 230, the laser 620 and the image raster map 905 controls the marking engine 23, the propulsion assembly 15, and the steering mechanisms 28 determines the appropriate raster pattern 915 to follow to print the new completed colorized image 910 shown in FIG. 14 without running over a previously printed area 920.

Figure 17:
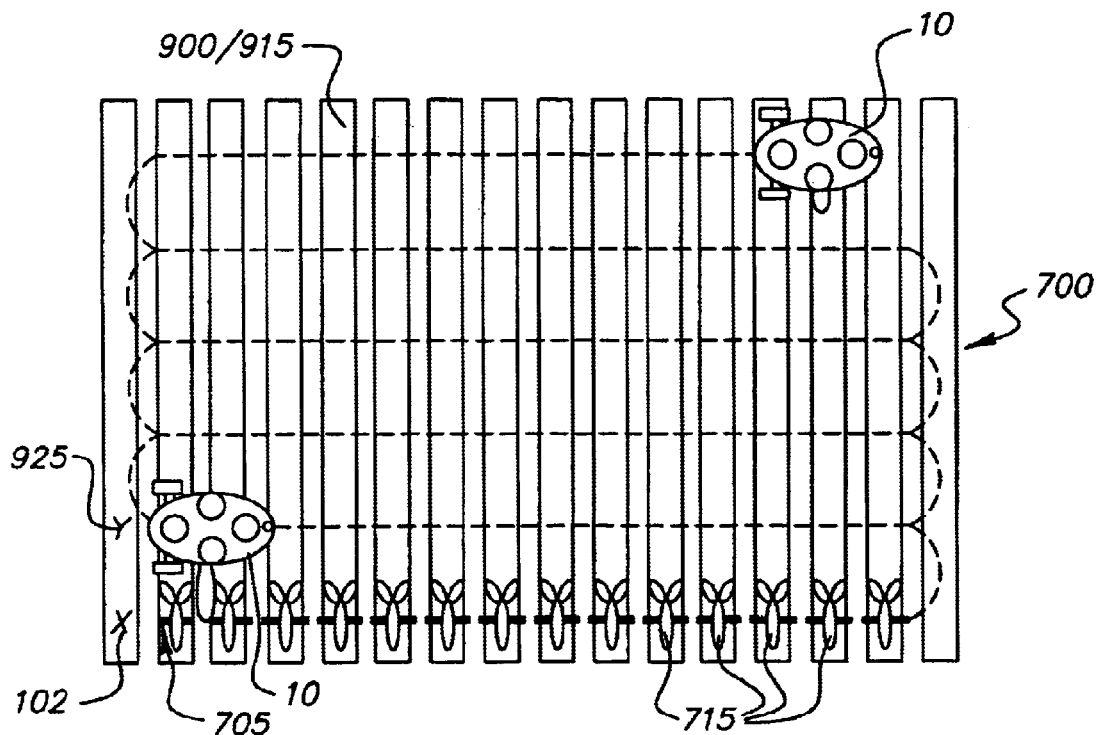
FIG. 17 is a schematic drawing of a large surface area or walkway such as a deck being painted with a repeating pattern using the apparatus of FIG. 1.

Referring to FIG. 17, another aspect of the invention is to add a decorative patterned border 715 to an otherwise plain deck 700. The user draws a line 705 or a crude image of a single pattern element that is to be replicated using the marker 215 described in FIG. 11 to indicate where the pattern 715 is to be printed. The apparatus 10 using the raster scan pattern 900 and starting point "X" 102 maps the deck 700 to determine where the line 705 or crude image of a single example of a pattern element is located on the deck 700. Using the line 705 or the crude image and the pattern 715 which has been previously chosen by the user and stored in the logic and control unit 35 or through enhancement of the crude image and selection of a repeating pattern generating mode, the logic and control unit 35 creates the appropriate raster map 915 of the deck 700, line 705, and repeating pattern 715 that replicates the single pattern element along the border. In this embodiment the apparatus 10 using the mapping procedure previously described and starting position "Y" 925 follows the line 705 and using the appropriate raster pattern 915, prints the decorative patterned border 715 on the plain decking surface.

Figure 18:
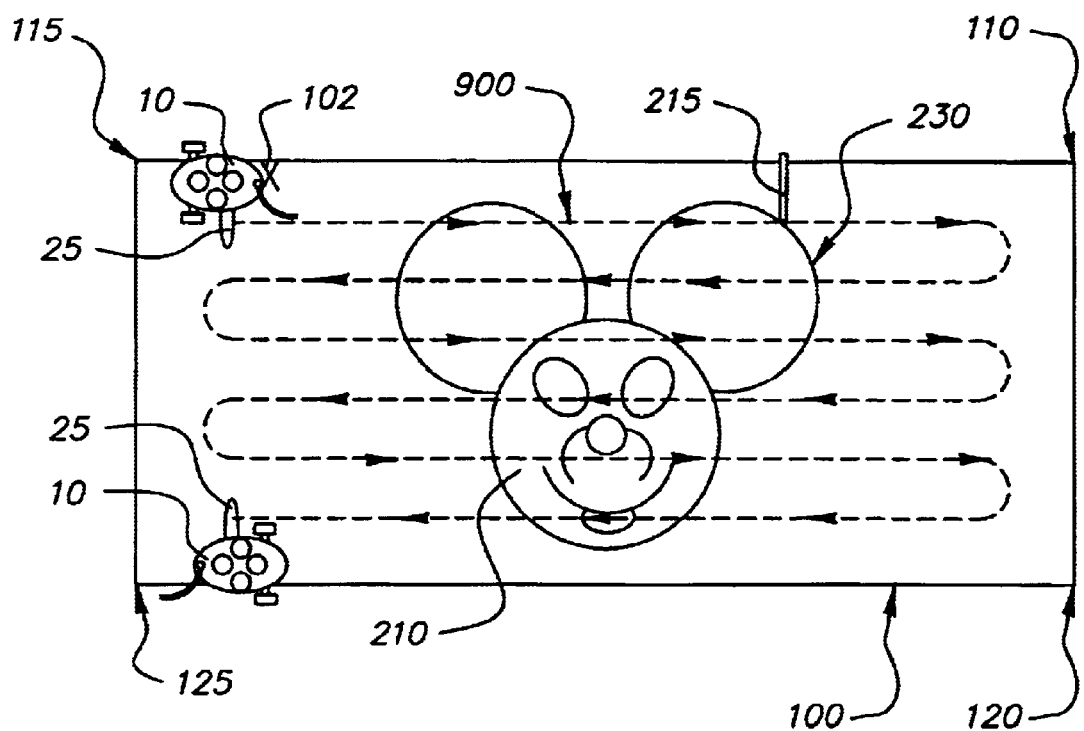
FIG. 18 is a schematic drawing of a large surface area with a crude image formed using a handheld marker and the crude image being scanned by the apparatus of FIG. 1.
Figure 19:
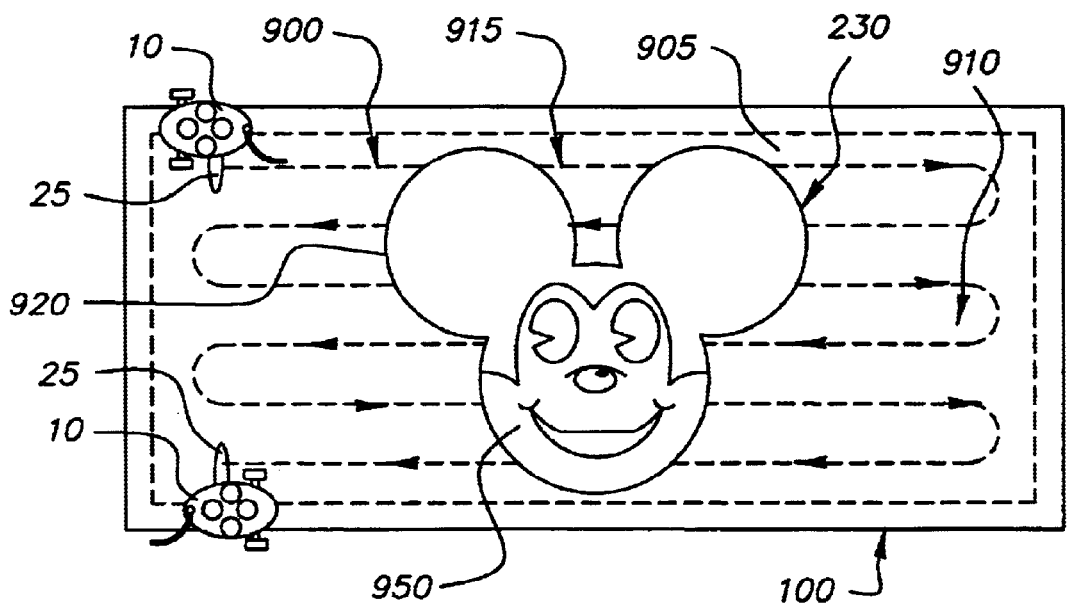
FIG. 19 is a schematic drawing of the large surface area with a finished printed image of the image of FIG. 18.
Figure 20:
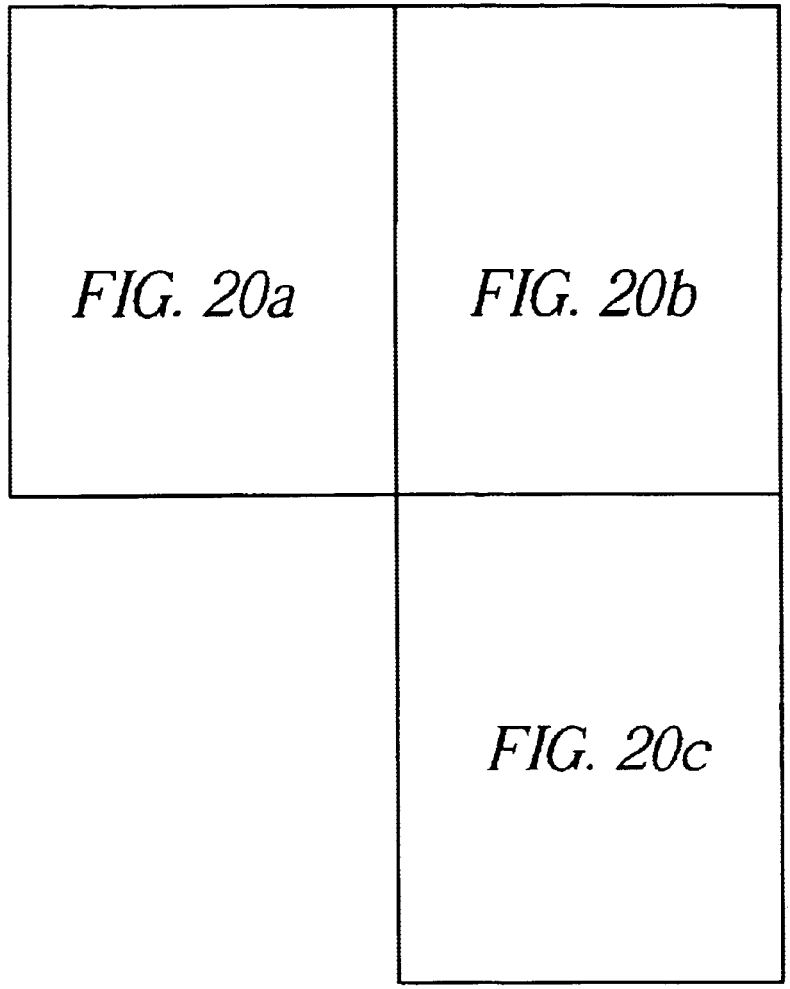
FIGS. 20, 20a, b and c are a flowchart of a process for mapping an image onto a large surface area or walkway in accordance with the embodiment of FIGS. 18 and 19.
Figure 20A:
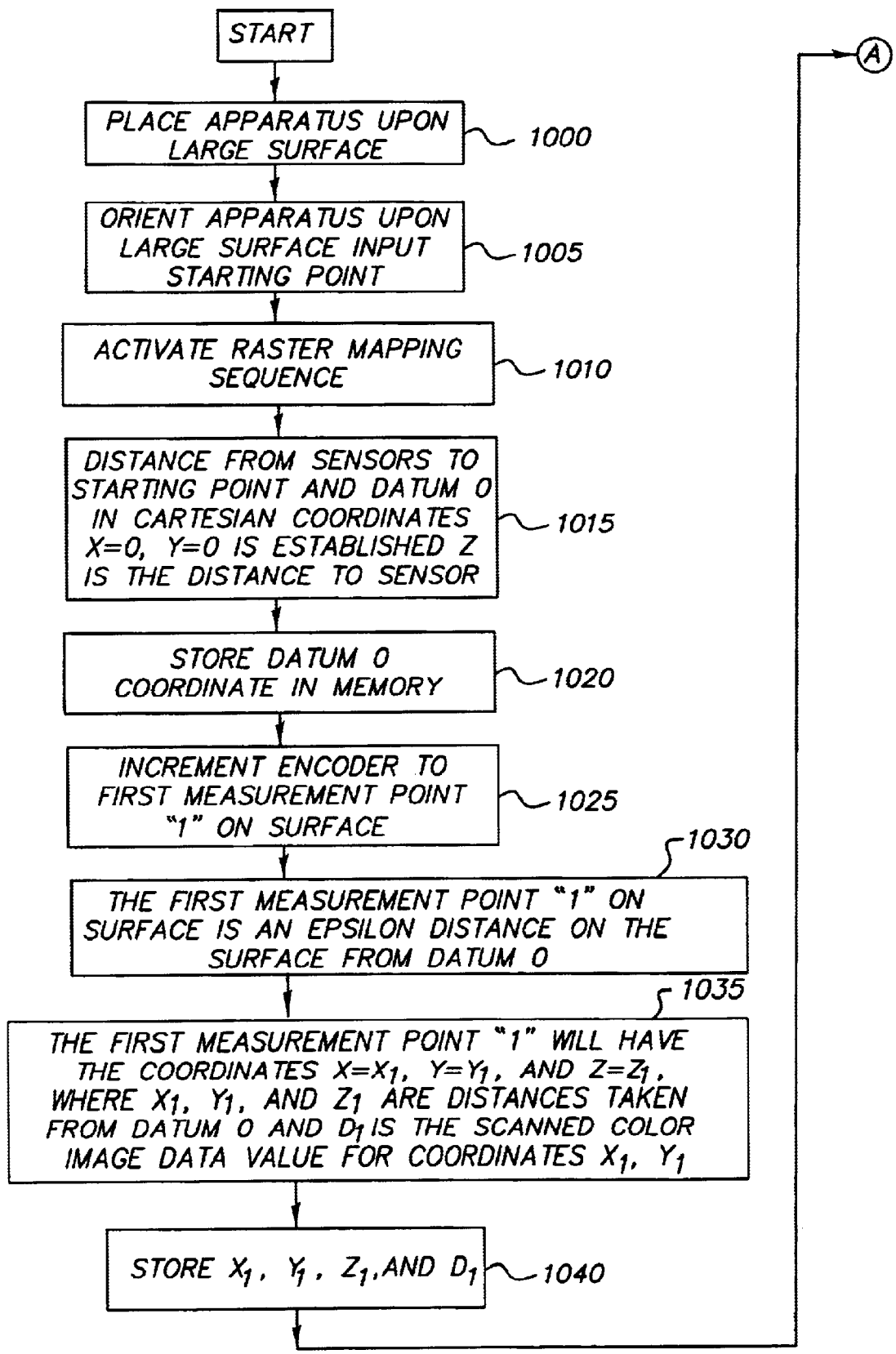
Figure 20B:
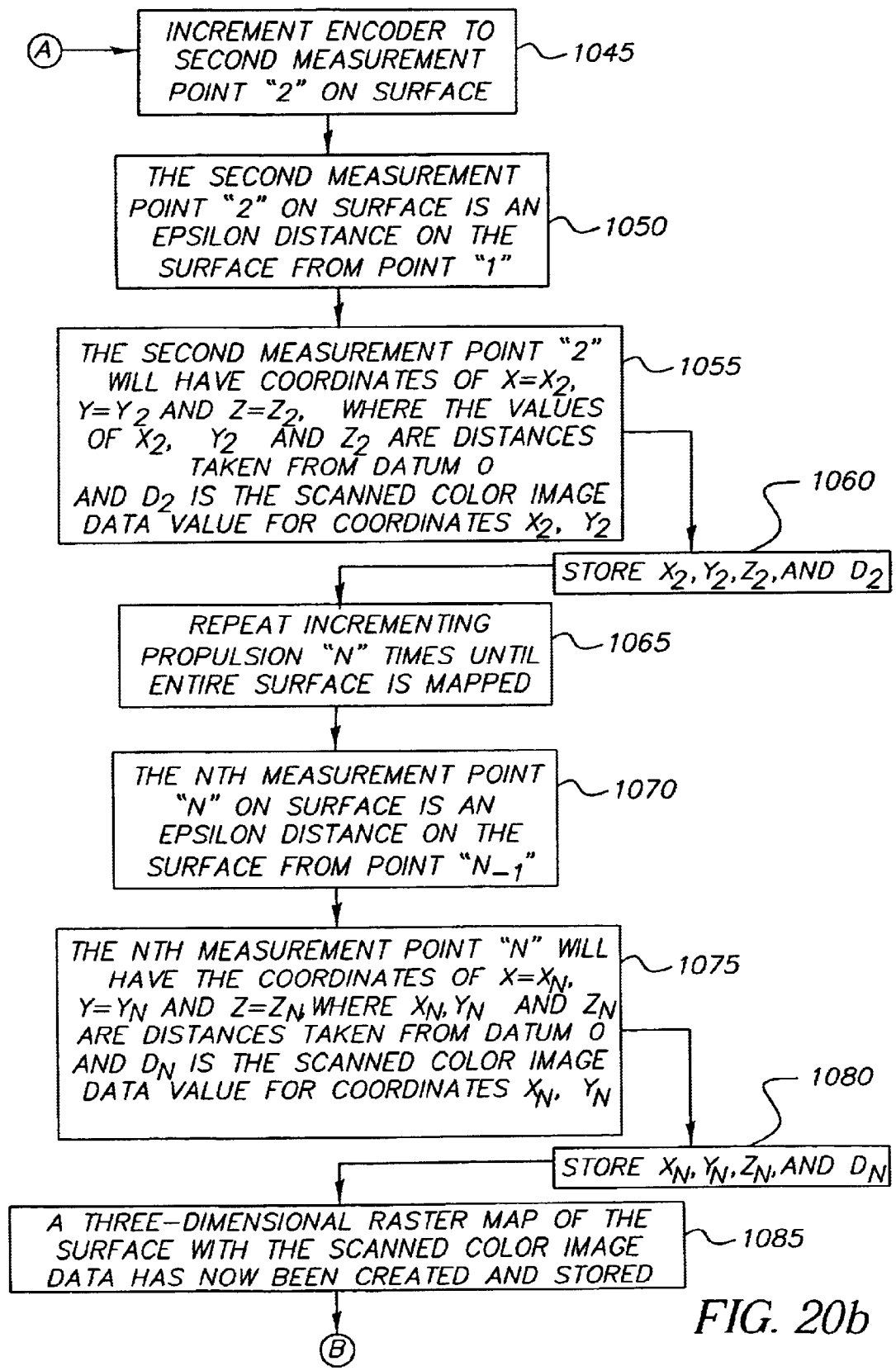
Figure 20C:
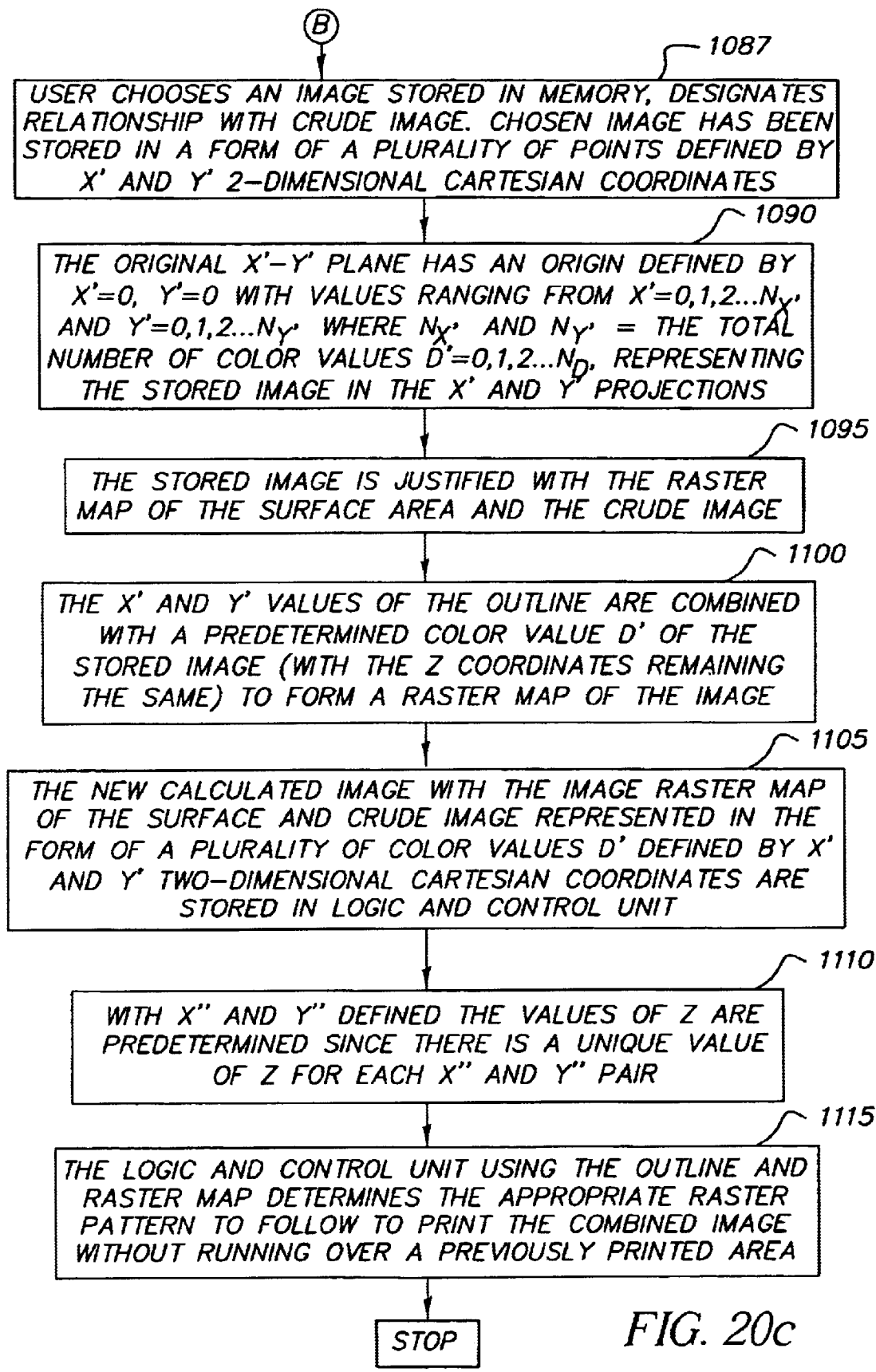

Referring now to FIGS. 18 and 19, in yet another embodiment of the present invention a detailed color image 950 stored as digital file in the logic and control unit 35 can be a more detailed depiction of the crude image 210 or can be a different image to be added to or incorporated into the crude image 210 drawn as the outline 230 on the large surface area 100 using the handheld marker 215 previously described. The stored image 950 can be a word, graphic, icon etc. The outline 230 representing the boundaries of the crude image 210 is drawn on the large surface area 100 using the handheld marker 215. As before the marker 215 applies material previously described, which can be detected by the sensor 42*a* and/or 42*b* shown in FIG. 1. The apparatus 10 crisscrosses the outline 230 in a raster scan pattern 900 scanning the outline 230 creating the image raster map 905 of the outline 230 which is stored in the logic and control unit 35.

Therefore, referring to FIGS. 1, 9, 10, 18, 19, 20*a*, 20*b* the manner in which area 100 and the drawn outline 230 in relationship to the crude image 210 is mapped into x, y and z Cartesian coordinates will now be described. After drawing the outline 230, the apparatus 10 is placed upon the large surface area 100 by the user at Step 1000. The user then records the orientation of the apparatus 10 on the large area 100 by inputting, via the input panel 37, the location of the starting position 102 at "X" of the apparatus 10. For example, the starting position 102 at "X" is located at the top right 110, but can be the top left 115, lower right 120 or lower left 125 at Step 1005. The starting position is chosen such that the apparatus 10 can travel over the outline 230 in the raster scan pattern 900. If the user chooses to randomly position the apparatus 10 any where along the outline 230, the apparatus would then scan to area 100 to determine the location of the outline 230 and then choose an appropriate point to begin the raster scan pattern 900. The user activates the mapping sequence as at Step 1010. Next, the logic and control unit 35 activates sensors 42*a* and 42*b* and encoders 19*a* and 19*b*. That is, the logic and control unit 35 effectively determines the location of the outline 230 or crude image 210 in the large surface area 100 from sensors 42*a* and 42*b* by scanning using the raster scan pattern 900. Distance of this initial point is determined either by use of light beams 76/78 or follower 155 and encoders 19*a* and 19*b*. This initial point is designated as a datum point "0" and will have Cartesian coordinates of x=0, y=0 and z=distance from sensor 42*a* and 42*b* as at Step 1015. The x, y and z coordinates for datum point "0" are sent to logic and control unit 35 and stored therein as at Step 1020. Logic and control unit 35 then activates propulsion assembly 15 to increment drive wheels 18*a* and 18*b* and encoders 19*a* and 19*b* a predetermined amount following the raster scan pattern 900 in order to sense a first measurement point "1" on area 100 as at Step 1025. This first measurement point, "1" is located at an epsilon or very small distance "δ" on area 100 in a predetermined direction following raster scan pattern 900 from datum point "0" as at Step 1030. Moreover, this first measurement point "1" will have coordinates of $x=x_1$, $y=y_1$ and $z=z_1$, where the values of $x_1$, $y_1$ and $z_1$ are distances defining location of measurement point "1" from datum point "0" and the scanned image data $d_1$ for point $x_1$, $y_1$ in the well-known three-dimensional Cartesian coordinate system as illustrated by Step 1035. The coordinates and image data $d_1$ of measurement point "1" are sent to logic and control unit 35 and stored therein as at Step 1040. Logic and control unit 35 then activates propulsion assembly 15 to increment drive wheels 18a and 18b and encoders 19a and 19b epsilon distance "δ" to a second measurement point "2" on area 100 as at Step 1045. That is, this second measurement point "2" is located at the epsilon distance "δ" on area 100 in a predetermined direction from first measurement point "1" following raster scan pattern 900 as illustrated by Step 1050. Moreover, this second measurement point "2" will have coordinates of $x=x_2$, $y=y_2$ and $z=z_2$, where the values of $x_2$, $y_2$ and $z_2$ are distances defining separation of measurement point "2" from datum point "0" and the scanned image data $d_2$ for point $X_2$, $y_2$ in the three-dimensional Cartesian coordinate system as illustrated by Step 1055. These coordinates of second measurement point "2" and image data $d_2$ are sent to logic and control unit 35 and stored therein as at Step 1060. In similar manner, logic and control unit 35 activates propulsion to assembly 15 to increment drive wheels 18a and 18b and encoders 19a and 19b by increments equal to epsilon distance "δ" about the entire area 100 to establish values of $x=0, 1, \ldots n_x$; $y=0, 1, \ldots n_y$; and $z=0, 1, 2, \ldots n_z$, where $n_x$, $n_y$ and $n_z$ equal the total number of measurement points to be taken on area 100 in the x, y and z directions and image data values of $d=0, 1, \ldots n_d$, where $n_d$ equals the total number of image data values taken on area 100 in the x, y direction following the raster scan pattern 900 respectively as at Step 1065. Each measurement point is spaced-apart from its neighbor by epsilon distance "δ" as illustrated by Step 1070. In this manner, all measurement points describing area 100 and image data values describing the outline 230 defining the crude image 210 following raster scan pattern 900 are defined relative to initial datum point "0", which is defined by $x=0$, $y=0$ and $z=$distance from sensor 42a and 42b as illustrated by Step 1075. The process disclosed hereinabove results in a three-dimensional raster map 905 of area 100 and the outline 230 being stored in logic and control unit 35 as x, y and z coordinates at Step 1085.

Referring now to FIGS. 1, 9, 10, 18, 19, and 20c, the user chooses the image 950 prestored as a digital file in the logic and control unit 35 and designates where the stored image 950 is to be placed in relationship to the crude image 210 as at Step 1087. The pre-stored image may be a logo or character that has enhanced image data not easily drawn by an ordinary user. Preferably image 950 has been previously stored in logic and control unit 35 and represented therein in the form of a plurality of color values d' defined by x' and y' two-dimensional Cartesian coordinates. That is, each point in image 950 stored in logic and control unit 35 has been previously assigned a color value d' for each x' and y' value representing image 950 in the x'-y' two-dimensional plane. This x'-y' plane has an origin defined by values of x'=0 and y'=0. The values in the x'-y' plane range from $x'=0, 1, 2, \ldots n_x'$ and from $y'=0, 1, 2, \ldots n_y'$, where $n_x'$ and $n_y'$ equal the total number of color values and the color values range from $d'=0, 1, 2, \ldots n_d'$ representing image 950 in the x' and y' directions, respectively as at step 1090. That is, the logic and control unit 35 performs a calculation, which justifies the image 950 stored therein with the x, y and z raster map 905 of area 100 and outline 230 as at Step 1095. Logic and control unit 35 then mathematically operates on the values defining the x'-y' plane of the image 950 in order to justify the x', y' and d' color values conforming image 950 to the x and y measurement values forming the image raster map 905 of area 100 as at Step 1100. The newly calculated image 950 with the image raster map 905 of the surface 100 and outline 230 represented therein in the form of a plurality of color points defined by x' and y' two-dimensional Cartesian coordinates are stored in the logic and control unit as at Step 1105. It should be understood from the description hereinabove, that once the values of x" and y" are defined, the values of z are predetermined because there is a unique value of z corresponding to each x" and y" pair as illustrated by Step 1110. The logic and control unit 35 using the outline 230 and raster map 905 determines the appropriate raster pattern 915 to follow to print and incorporate the new image 950 into the crude image 210 without running over a previously printed area 920 as at Step 1115.

As is evident from the foregoing description, certain other aspects of the invention are not limited to the particular details of the examples illustrated, and it is therefore contemplated that other modifications and applications will occur to those skilled in the art. It is accordingly intended that the claims shall cover all such modifications and applications as do not depart from the true spirit and scope of the invention.

Parts List 10 apparatus
15 propulsion assembly
18a, 18b drive wheel
19a, 19b encoder
20a, 20b stepper motor
22 frame
23 marking engine
24 print head
25 a sliding or rotating arm
26 arm positioner
27 steerable wheel
28 steering control
29a, 29b swath or line of print
30 power supply
31 arrow
35 logic and control unit
37 input panel
40 communications device
42 sensor
43 guide finger
44a, 44b, 44c, 44d arrows
45a, 45b, 45c, 45d reservoirs
47 arrow
48 arrow
50a, 50b, 50c, 50d marking solutions
55 Erasable Programmable Read Only Memory (EPROM)
60 EPROM slot
62 positioning mechanism
65 image
70 plate
71a, 71b, 71c, 71d nozzles
72 common point
73a, 73b, 73c, 73d tubing lines
74 photodiode light source
75a, 75b, 75c, 75d channel-shaped chambers
76 laser light beam
78 reflected light beam
79 light detector 80 sensor
81a, 81b, 81c, 81d nozzle orifices
82 marking solution meniscus
85 marking solution body
86 surface area
87a, 87b, 87c, 87d transducers
88 drop
89 arrow
90a, 90b, 90c, 90d lines
92 display
94 fiducial
96 keyboard
100 area
102 starting position
105 center
110 top right
115 top left
120 lower right
125 lower left
130 map
150 telescoping spring-loaded follower
155 end portion
157 arrow
205 line or boundary
210 crude image
215 marker
220 material
225 word
230 outline
235 graphic
240 area
270 through 505 generalized process steps
610 reflector
615 laser beam
620 laser
625 sensor
700 deck
705 line
715 decorative patterned border
900 raster scan pattern
905 image raster map
910 completed image
915 appropriate raster pattern
920 previously printed areas
925 starting position
950 image
1000 through 1115 generalized process steps

What is claimed is:

1. An apparatus for printing an image on a surface, the apparatus comprising:
    a movable marking engine including a scanner, the marking engine moving along the surface and the scanner being operative to sense a crude image upon the surface and to generate data signals representing the crude image or boundaries defined by the crude image scanned; and
    a controller for controlling the marking engine, the controller being responsive to the data signals to control the marking engine to print an enhanced image of the crude image and/or to color the crude image so that the printing overlies the crude image, wherein the marking engine is supported on a self-propelled vehicle that includes a drive that engages the surface at plural locations for moving the marking engine along the surface.

2. The apparatus of claim 1 and including a display that displays the crude image sensed by the scanner.

3. The apparatus of claim 1 and wherein the crude image represents an outline and the controller controls the marking engine to colorize the crude image within the scanned boundaries.

4. The apparatus of claim 1 and wherein the controller controls the marking engine to advance the scanner to scan the crude image in straight raster lines.

5. The apparatus of claim 4 and wherein the controller controls the marking engine to first scan a first predetermined entire area during a first pass and then controls the marking engine to print and/or color upon the area in a second pass.

6. The apparatus of claim 5 and wherein the marking engine is located outboard of an area defined by lines connecting the plural locations so that during operation of the marking engine for imagewise printing and/or coloring the drive does not engage areas of the surface that have been previously imagewise printed and/or colored by the marking engine.

7. The apparatus of claim 5 and wherein the marking engine is an ink jet marking device.

8. The apparatus of claim 5 and wherein a signaling device is provided external to the boundary to emit a signal to identify a boundary location of a predetermined area that includes the crude image.

9. The apparatus of claim 8 and wherein the signaling device comprises a laser beam emitter that emits a laser beam signal and a reflector is mounted on the vehicle and reflects the laser beam signal to a sensor.

10. The apparatus of claim 1 and wherein the marking engine is an ink jet marking device.

11. The apparatus of claim 1 and wherein the controller controls the marking engine to advance the scanner to scan the crude image in a path defined by the crude image.

12. The apparatus of claim 1 and wherein the controller controls the marking engine to first scan a first predetermined entire area during a first pass and then controls the marking engine to print upon and/or color the area in a second pass.

13. The apparatus of claim 12 and wherein the marking engine is an ink jet marking device.

14. The apparatus of claim 1 and wherein the marking engine is located outboard of an area defined by lines connecting the plural locations so that during operation of the marking engine for imagewise printing and/or coloring the drive does not engage areas of the surface that have been previously imagewise printed and/or colored by the marking engine.

15. A method for printing an image on a surface, the method comprising the steps of:
    providing a movable marking engine that includes a scanner, the marking engine mounted on a self-propelled vehicle that includes a drive that engages the surface at plural locations for moving the marking engine along the surface;
    moving the marking engine via the self-propelled vechicle along the surface and operating the scanner to sense a crude image upon the surface and generating data signals representing the crude image or boundaries defined by the crude image scanned; and
    in response to the data signals operating the marking engine to print an enhanced image of the crude image and/or to color the crude image so that the printing overlies the crude image.

16. The method of claim 15 and including generating a display of the crude image sensed by the scanner.

17. The method of claim 15 and wherein the crude image represents an outline and the marking engine colorizes the crude image within the scanned boundaries.

18. The method of claim 15 and wherein the marking engine advances the scanner to scan the crude image in straight raster lines.

19. The method of claim 18 and wherein the marking engine first scans a first predetermined entire area during a first pass and then controls the marking engine to print and/or color upon the area in a second pass.

20. The method of claim 15 and wherein the marking engine is located outboard of an area defined by lines connecting the plural locations so that during operation of the marking engine for imagewise printing and/or coloring a drive does not engage areas of the surface that have been previously imagewise printed and/or colored by the marking engine.

21. The method of claim 20 and wherein the marking engine is an ink jet marking device.

22. The method of claim 15 and wherein the marking engine is an ink jet marking device.

23. The method of claim 15 and wherein the marking engine advances the scanner to scan the crude image in a path defined by the crude image.

24. The method of claim 15 and wherein the marking engine first scans a first predetermined entire area during a first pass and then the marking engine prints upon and/or colorizes the area in a second pass.

25. The method of claim 24 and wherein the marking engine is an ink jet marking device.

26. The method of claim 15 and wherein the marking engine is an ink jet marking device.

27. The method of claim 15 and wherein a signaling device is provided external to the boundary and emits a signal to identify a boundary location of a predetermined area that includes the crude image.

28. The method of claim 27 and wherein the signal comprises a laser beam signal and the signal is reflected from the vehicle supporting the marking engine.

29. The method of claim 15 and wherein the marking engine is located outboard of an area defined by lines connecting the plural locations so that during operation of the marking engine for imagewise printing and/or coloring a drive does not engage areas of the surface that have been previously imagewise printed and/or colored by the marking engine.

30. The method of claim 15 and wherein a selection is provided of plural stored images for printing and in response to a selection of a particular stored image and the sensing of the crude image the marking engine prints the enhanced image.

31. The method of claim 15 and wherein image data representing a character or logo is prestored in a memory associated with the marking engine before scanning of the crude image and in response to a selection for printing of such character or logo and the scanning of the crude image the enhanced image is printed by the marking engine.

32. The method of claim 15 and wherein the crude image sensed is printed as an enhanced image and in a repeating pattern of the enhanced image.

33. The method of claim 15 and wherein a handheld marker is used to create the crude image upon the surface which is a walkway.

34. The method of claim 15 and wherein the surface is a walkway.

35. An apparatus for printing an image on a surface, the apparatus comprising:

a movable marking engine including a scanner, the marking engine moving along the surface and the scanner being operative to sense a crude image upon the surface and to generate data signals representing the crude image or boundaries defined by the crude image scanned;

a display that displays the crude image sensed by the scanner: and a controller for controlling the marking engine, the controller being responsive to the data signals to control the marking engine to print an enhanced image of the crude image and/or to color the crude image so that the printing overlies the crude image.

36. A method for printing an image on a surface, the method comprising the steps of:

providing a movable marking engine that includes a scanner;

moving the marking engine along the surface and operating the scanner to sense a crude image upon the surface and generating data signals representing the crude image or boundaries defined by the crude image scanned;

generating a display of the crude image sensed by the scanner; and in response to the data signals operating the marking engine to print an enhanced image of the crude image and/or to color the crude image so that the printing overlies the crude image.

* * * * *

UNITED STATES PATENT AND TRADEMARK OFFICE
CERTIFICATE OF CORRECTION

PATENT NO. : 6,951,375 B2
DATED : October 4, 2005
INVENTOR(S) : David L. Patton et al.

It is certified that error appears in the above-identified patent and that said Letters Patent is hereby corrected as shown below:

Column 15,
Line 51, after "a" delete "movable".

Signed and Sealed this

Sixth Day of December, 2005

JON W. DUDAS
*Director of the United States Patent and Trademark Office*